(12) United States Patent
Munakata et al.

(10) Patent No.: US 12,399,580 B2
(45) Date of Patent: *Aug. 26, 2025

(54) THREE-DIMENSIONAL POSITION INDICATOR AND THREE-DIMENSIONAL POSITION DETECTION SYSTEM INCLUDING GRIP PART AND TRACKER

(71) Applicant: Wacom Co., Ltd., Saitama (JP)

(72) Inventors: Hiroshi Munakata, Saitama (JP); Hiroshi Tamano, Saitama (JP); Yuanhao Chen, Saitama (JP)

(73) Assignee: Wacom, Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/423,011

(22) Filed: Jan. 25, 2024

(65) Prior Publication Data

US 2024/0192788 A1    Jun. 13, 2024

Related U.S. Application Data

(63) Continuation of application No. 17/681,666, filed on Feb. 25, 2022, now Pat. No. 11,934,592, which is a
(Continued)

(30) Foreign Application Priority Data

Mar. 23, 2018 (JP) .................. 2018-055544

(51) Int. Cl.
*G06F 3/0354* (2013.01)
*G06F 3/0346* (2013.01)
(Continued)

(52) U.S. Cl.
CPC ........ *G06F 3/03545* (2013.01); *G06F 3/0346* (2013.01); *G06F 3/0383* (2013.01); *G06F 3/044* (2013.01); *G06F 3/046* (2013.01)

(58) Field of Classification Search
CPC .. G06F 3/03545; G06F 3/0346; G06F 3/0383; G06F 3/044; G06F 3/046
See application file for complete search history.

(56) References Cited

U.S. PATENT DOCUMENTS

| 4,991,148 A | 2/1991 | Gilchrist |
| 5,488,204 A * | 1/1996 | Mead .................... G06F 3/0446 |
| | | 345/179 |

(Continued)

FOREIGN PATENT DOCUMENTS

| EP | 1 228 480 A1 | 8/2002 | |
| EP | 4053227 A1 * | 9/2022 | ............. C09D 11/17 |

(Continued)

OTHER PUBLICATIONS

Extended European Search Report, dated May 12, 2021, for European Application No. 18910270.0-1216, 14 pages.
(Continued)

*Primary Examiner* — David D Davis
(74) *Attorney, Agent, or Firm* — Seed Intellectual Property Law Group LLP

(57) ABSTRACT

A position indicator indicates a position in a three-dimensional (3D) space. The position indicator includes an elongated casing; a position indicating part which is disposed at one end of the elongated casing and which, in operation, indicates the position; a grip part configured to be gripped with a palm of a user in a state in which the elongated casing is gripped between fingers of the user; and a tracker which, in operation, causes an external device to detect a tracker position of the tracker in the 3D space, wherein the tracker is disposed so as to be not covered by the user's hand when the user palm-grips the grip part. The tracker position of the tracker and a position of the position indicating part are in a specific positional relation.

14 Claims, 9 Drawing Sheets

Related U.S. Application Data continuation of application No. 17/010,652, filed on Sep. 2, 2020, now Pat. No. 11,294,478, which is a continuation of application No. PCT/JP2018/046976, filed on Dec. 20, 2018.

(51) Int. Cl.
  *G06F 3/038* (2013.01)
  *G06F 3/044* (2006.01)
  *G06F 3/046* (2006.01)

(56) References Cited

U.S. PATENT DOCUMENTS

| | | | |
|---|---|---|---|
| 9,367,169 B2 | 6/2016 | Tan | |
| 11,934,592 B2* | 3/2024 | Munakata | G06F 3/03545 |
| 2002/0051359 A1* | 5/2002 | Hisasue | B43K 29/10 |
| | | | 463/47 |
| 2005/0073508 A1* | 4/2005 | Pittel | G06F 3/03542 |
| | | | 345/175 |
| 2005/0190163 A1* | 9/2005 | Sarasmo | G06F 3/03545 |
| | | | 345/179 |
| 2008/0166175 A1* | 7/2008 | Pittel | B43K 23/02 |
| | | | 401/131 |
| 2010/0021022 A1* | 1/2010 | Pittel | G06F 3/03545 |
| | | | 206/320 |
| 2010/0091112 A1 | 4/2010 | Veeser et al. | |
| 2011/0007037 A1* | 1/2011 | Ogawa | G06F 3/046 |
| | | | 345/179 |
| 2012/0229384 A1* | 9/2012 | Nakane | G06F 3/03545 |
| | | | 345/158 |
| 2014/0354553 A1* | 12/2014 | Dai | G06F 3/044 |
| | | | 345/173 |
| 2015/0116289 A1* | 4/2015 | Stern | G06F 3/03545 |
| | | | 345/179 |
| 2015/0116290 A1* | 4/2015 | Wheaton | B43K 7/12 |
| | | | 345/179 |
| 2016/0041632 A1* | 2/2016 | Ono | G06F 3/03542 |
| | | | 345/175 |
| 2016/0253043 A1* | 9/2016 | Narikawa | G06F 3/0425 |
| | | | 348/744 |
| 2017/0168599 A1* | 6/2017 | Zenghui | G06F 3/0393 |
| 2017/0177099 A1* | 6/2017 | Tamura | G06F 3/0446 |
| 2017/0185233 A1* | 6/2017 | Ono | G06F 3/0386 |
| 2017/0308184 A1* | 10/2017 | Kato | G06F 3/0383 |
| 2017/0357334 A1 | 12/2017 | Balan et al. | |
| 2021/0048897 A1 | 2/2021 | Munakata et al. | |
| 2021/0072847 A1* | 3/2021 | Ide | G06F 3/03545 |
| 2021/0278293 A1* | 9/2021 | Kinokuni | G06F 3/0447 |

FOREIGN PATENT DOCUMENTS

| | | | | |
|---|---|---|---|---|
| JP | 2001-344060 A | | 12/2001 | |
| JP | 2010-509582 A | | 3/2010 | |
| JP | 5723499 B1 | * | 5/2015 | G06F 1/3206 |
| WO | WO-0135329 A1 | * | 5/2001 | G06F 3/0346 |
| WO | WO-2008056180 A2 | * | 5/2008 | G01B 11/002 |
| WO | 2016158418 A1 | | 10/2016 | |
| WO | WO-2019220803 A1 | * | 11/2019 | G06F 3/011 |
| WO | WO-2019225170 A1 | * | 11/2019 | G06F 3/011 |

OTHER PUBLICATIONS

International Search Report, mailed Mar. 5, 2019, for International Application No. PCT/JP2018/046976, 4 pages. (With English translation).

Poupyrev et al., "Virtual Notepad: Handwriting in Immersive VR," *IEEE*, 1998. (7 pages).

* cited by examiner

| ID | LIGHT EMISSION SENSOR INFORMATION | NINE-AXIS SENSOR INFORMATION | OPERATION INFORMATION | CORRECTION VALUES (Δx, Δy, Δz) | ...... |

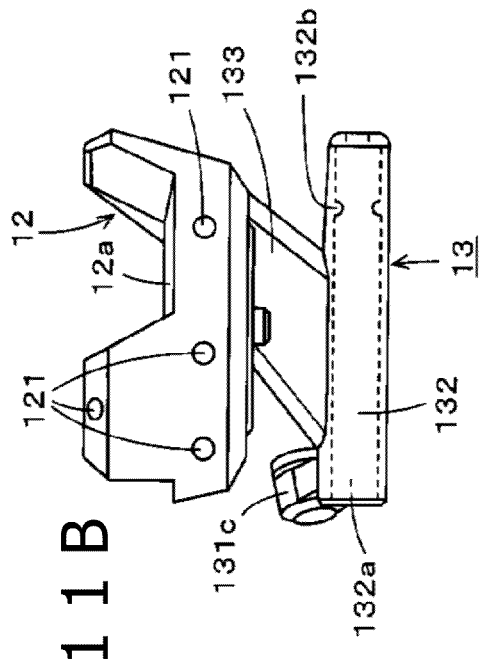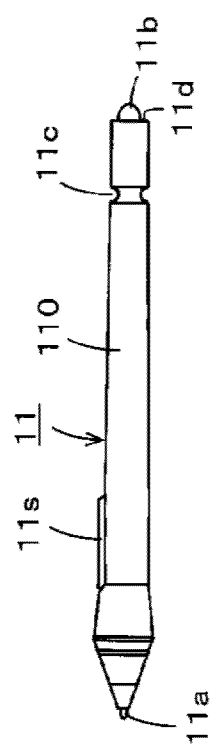

THREE-DIMENSIONAL POSITION INDICATOR AND THREE-DIMENSIONAL POSITION DETECTION SYSTEM INCLUDING GRIP PART AND TRACKER

BACKGROUND

Technical Field

The disclosure relates to a three-dimensional position indicator and a three-dimensional position detection system suitable to be used for three-dimensional rendering (3D rendering), for example.

Description of the Related Art

Known is a rendering system with which an animation image or the like is created by continuously carrying out position indication to a coordinate input device called a digitizer and carrying out rendering by an electronic pen. In this case, the operator carries out a position indication operation for generating a rendering image in a state in which a pen tip of the electronic pen is brought into contact with an input surface of a tablet device that incorporates the digitizer, or in a state in which the pen tip is put in an upper-side region in which position detection is possible while the pen tip is not in contact with the input surface of the tablet device (hover state). The digitizer detects the position indicated by the electronic pen and generates a rendering image as the detection result thereof to display the rendering image on a display screen. The operator carries out rendering while checking the rendering image displayed on the display screen.

Recently, rendering systems and applications that allow a rendering image displayed on a two-dimensional display screen to be rendered and expressed like a three-dimensional image visually have appeared. In this case, many of the rendering systems and applications detect, using a motion sensor, a motion operation (gesture) for rendering an image generated using a digitizer, which is indicated by motion of a hand or finger of the operator, and perform three-dimensional rendering expression processing based on the detected motion operation (gesture).

Incidentally, a user interface with which both position indication input and operation input of gesture and so forth as the above-described ones can be carried out has been provided. For example, in Patent Document 1 (U.S. Pat. No. 9,367,169), disclosed is a touch controller that is one that uses a device including a touch sensor configured to detect a finger touch by an operator and a motion sensor configured to detect motion and that is configured to switch the touch sensor from a hover event detection mode to a gesture event detection mode in response to a signal from the motion sensor.

PRIOR ART DOCUMENT

Patent Document

Patent Document 1: U.S. Pat. No. 9,367,169

BRIEF SUMMARY

Technical Problems

However, in Patent Document 1, switching between the hover event detection mode and the gesture event detection mode is carried out in a hover region that is a spatial region in a distance range limited from an input surface of the touch sensor, and the operator needs to make gesture while keeping the hover state with respect to the touch sensor. Thus, the operator needs to make gesture in the limited spatial region and therefore, there is a problem that it is difficult to carry out work for 3D rendering. Furthermore, in Patent Document 1, operation with fingers of the operator is assumed and therefore, there is also a problem that it is difficult to carry out more detailed indication operation. Moreover, in Patent Document 1, switching between the hover event detection mode and the gesture event detection mode is carried out in response to a signal from the motion sensor. Therefore, there is a problem that the tilt of the device needs to be changed for the switching each time.

The disclosure intends to provide a three-dimensional position indicator and a three-dimensional position detection system configured to be capable of solving the above-described problems.

Technical Solution

In order to solve the above-described problems, there is provided a three-dimensional position indicator that indicates a position on an input surface of a position detecting sensor in a three-dimensional space. The three-dimensional position indicator includes: a casing, a position indicating part that is disposed at one end of the casing, wherein and the position indicating part, in operation, indicates a the position on the input surface of the position detecting sensor, and a tracker for causing which, in operation, causes an external device to detect a the position in the three-dimensional space, wherein the a position of the tracker and the a position of the position indicating part are in a specific positional relation.

Furthermore, in order to solve the above-described problems, there is provided a three-dimensional position detection system including a position indicator, a position detecting sensor, and a spatial position detecting device. The position indicator includes: a casing, a position indicating part that is disposed at one end of the casing. The position indicating part, in operation, indicates a position on an input surface of the position detecting sensor, a tracker which, in operation, causes the spatial position detecting device to detect a position in the three-dimensional space, a position of the tracker and a position of the position indicating part being in a specific positional relation, and a communication circuit which, in operation, communicates with the position detecting sensor and causes the position detecting sensor to detect the position on the input surface of the position detecting sensor indicated by the position indicating part. The spatial position detecting device includes a circuit which, in operation, calculates a position of the position indicating part in the three-dimensional space, based on the position in the three-dimensional space detected by interaction of the spatial position detecting device with the tracker and the specific positional relation The three-dimensional position indicator with the above-described configuration causes the position indicated by the position indicating part on the one end of the casing to be detected by the position detecting sensor, by carrying out interaction with the position detecting sensor by the interaction part.

Furthermore, the three-dimensional position indicator includes the tracker that causes the external device to detect the position in the three-dimensional space. Therefore, in the above-described three-dimensional position detection system, the spatial position detecting device can detect the position in the three-dimensional space irrespective of the positional relation between the three-dimensional position indicator and the position detecting sensor.

According to this configuration, in the above-described three-dimensional position detection system, the operator can carry out fine rendering by position indication performed by the tip part of the bar-shaped part of the three-dimensional position indicator on the input surface of the position detecting sensor. In addition, the operator can carry out input operation with respect to a 3D rendering image by making gesture based on motion of the position of the three-dimensional position indicator in the three-dimensional space free from limitation on the positional relation with the position detecting sensor.

Here, because the position of the tracker of the three-dimensional position indicator is at a position different from the position indicating part, a difference arises between the position detected by the position detecting sensor and the position in the three-dimensional space detected by the spatial position detecting device. In this case, in the case of carrying out work with switching between rendering operation with the position detecting sensor and gesture operation with the spatial position detecting device as a series of operation, by use of the three-dimensional position indicator, the position indicated by the three-dimensional position indicator differs depending on the operation. Thus, possibly, continuous position indication operation becomes impossible and it becomes impossible to smoothly carry out the work.

However, in the three-dimensional position indicator with the above-described configuration, the position indicating part is disposed to be in the specific positional relation with the position and the direction detected by interaction between the tracker and the spatial position detecting device. Accordingly, in the spatial position detecting device, the position of the position indicating part detected as the indicated position, based on the position detected by the interaction with the tracker and the specific positional relation.

Therefore, the user can employ the position indicating part as the indicated position not only in the input surface of the position detecting sensor but also in the three-dimensional space based on the spatial position detecting device. Thus, consistency is kept in the operation work, and it becomes possible to smoothly carry out three-dimensional rendering work.

BRIEF DESCRIPTION OF THE SEVERAL VIEWS OF THE DRAWINGS

FIGS. 11A, 11B, and 11C depict diagrams for explaining a configuration example of the three-dimensional position indicator according to another embodiment of the disclosure.

DETAILED DESCRIPTION

Several embodiments of a spatial position detection system according to the disclosure will be described below with reference to the drawings.

First Embodiment

A spatial position detection system according to a first embodiment of the disclosure is an example in which a configuration of a head-mounted display is employed as a display part and a space of virtual reality (including VR (Virtual Reality), MR (Mixed Reality), AR (Augmented Reality), and so forth hereinafter abbreviated as VR) is employed as a 3D rendering space.

Figure 1:
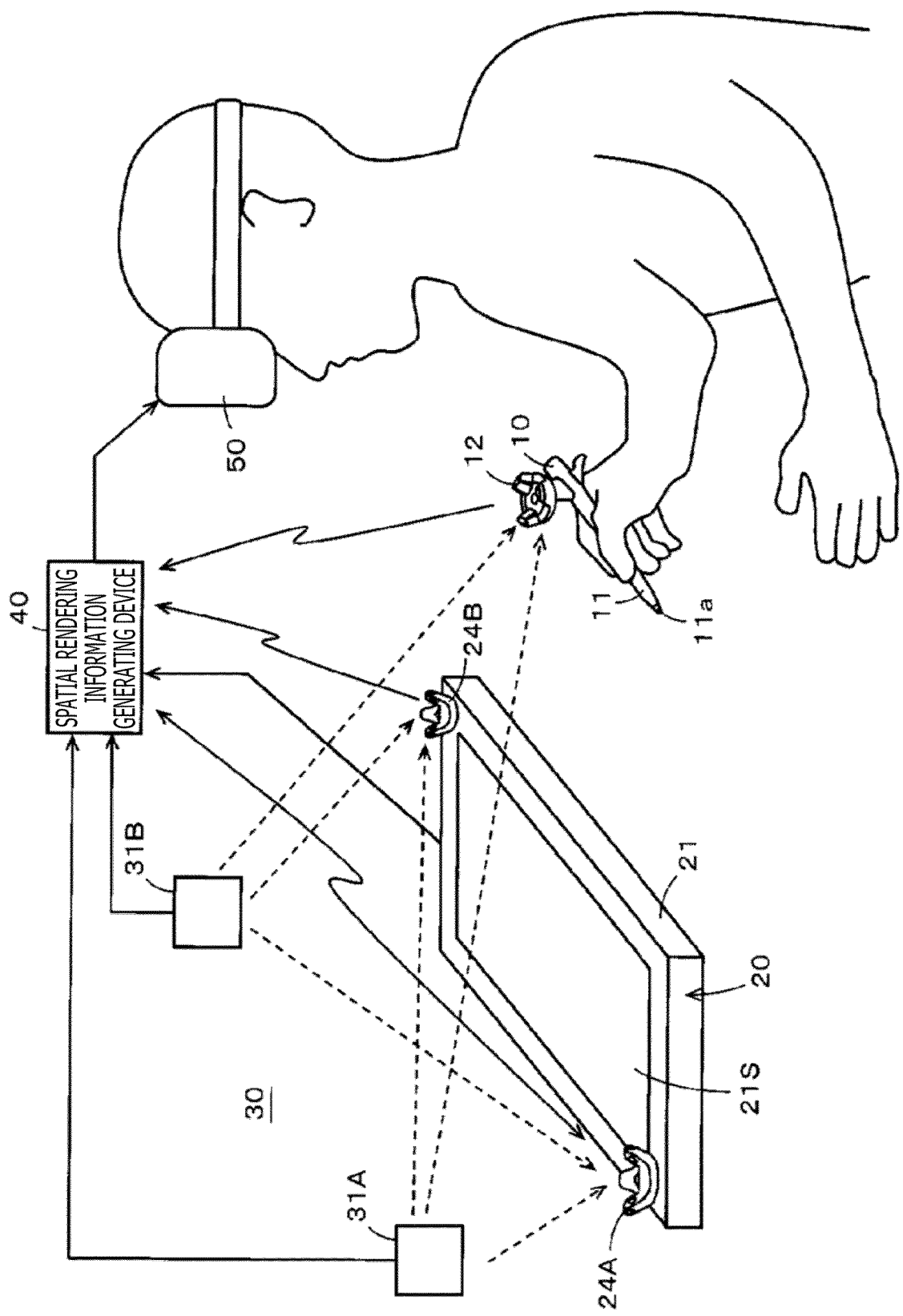
FIG. 1 is a diagram for explaining the outline of a spatial position detection system according to a first embodiment of the disclosure.
Figure 2:
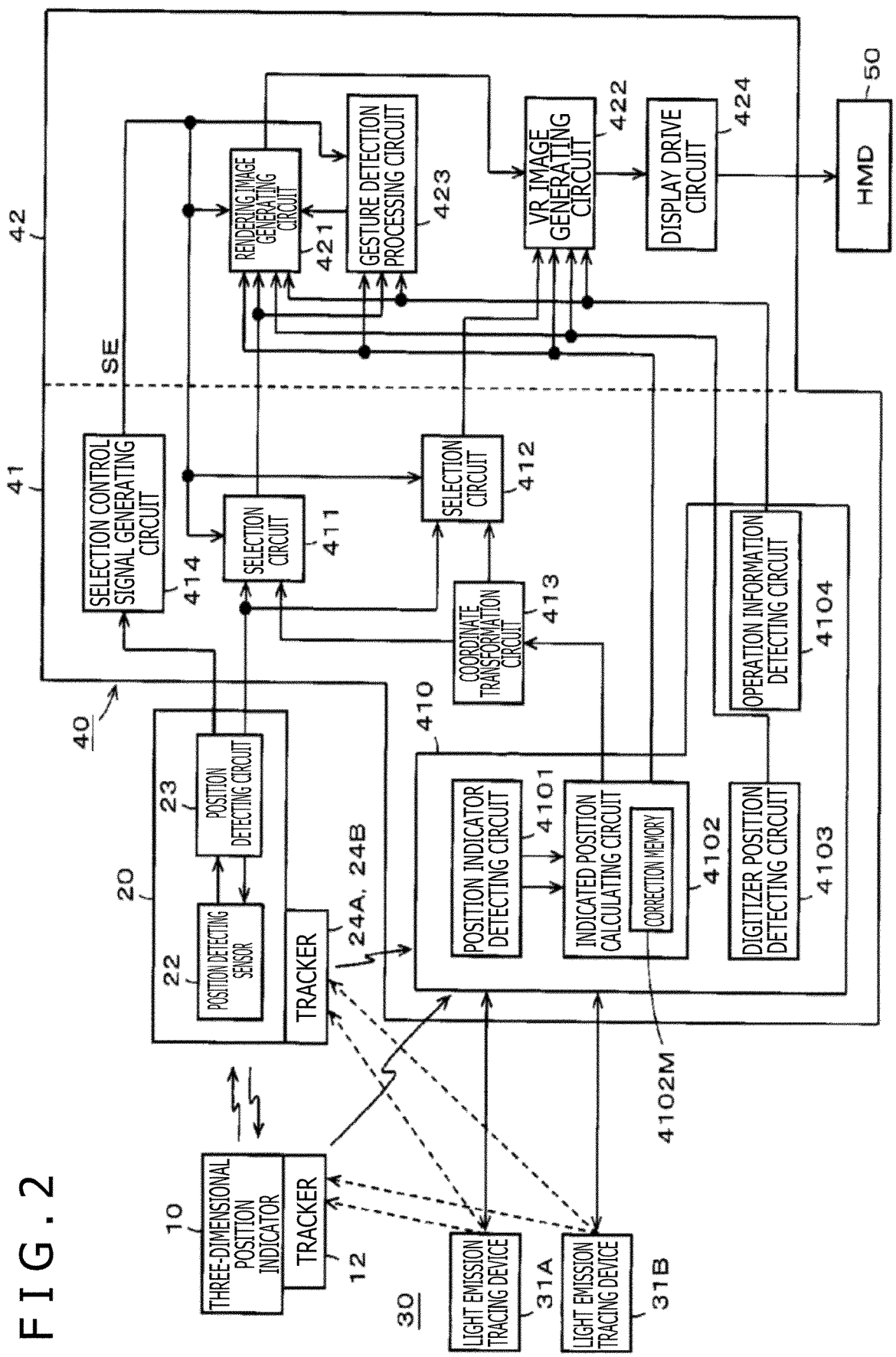
FIG. 2 is a block diagram for explaining a configuration example of the spatial position detection system according to the first embodiment of the disclosure.

FIG. 1 is a diagram illustrating the outline of the overall configuration of the spatial position detection system of this first embodiment in which a space of VR is employed as the 3D rendering space. Further, FIG. 2 is a block diagram illustrating a detailed configuration example of functions of the respective parts of the spatial position detection system of this first embodiment.

As depicted in FIG. 1, the spatial position detection system of this first embodiment is configured to include a three-dimensional position indicator, a digitizer 20, a unit 30 for spatial position detection, a spatial rendering information generating device 40, and a head-mounted display (hereinafter, referred to as HMD) 50. As depicted in FIG. 2, in this example, the spatial rendering information generating device 40 has functions of an input information processing part 41 and a display image generating part 42 and includes a personal computer, for example. The input information processing part 41 has functions of a spatial position detecting device. As depicted in FIG. 2, in this specification, each of processing functions performed by executing a program of the personal computer is depicted as each "circuit" block for convenience of explanation. For example, the spatial rendering information generating device 40 includes a processor and a memory storing instructions that, when executed by the processor, cause the spatial rendering information generating device 40 to perform the functions of the various circuits of the spatial rendering information generating device 40 shown in FIG. 2.

In the spatial position detection system of this first embodiment, the spatial rendering information generating device 40 including the input information processing part 41 and the display image generating part 42 is used. However, as the spatial position detection system of the disclosure, a configuration composed of the three-dimensional position indicator, the digitizer 20, the unit 30 for spatial position detection, and the input information processing part 41 may be employed, and the display image generating part 42 may be configured to be disposed separately.

A three-dimensional position indicator 10 has a function of causing the position of a tip on one end side of a bar-shaped part in the axis center direction to be an indicated position in an input surface of the digitizer 20 and causing the position of the tip to be an indicated position in a three-dimensional space detected by a spatial position detection function of the input information processing part 41 by use of the unit 30 for spatial position detection.

As depicted in FIG. 1, in this example, the bar-shaped part of the three-dimensional position indicator 10 is formed of an electronic pen 11 allowed to be inserted and removed. In this example, a tip 11a (hereinafter, referred to as a pen tip 11a) of a core body that protrudes from an opening of one end part of a tubular casing of the electronic pen 11 in the axis center direction serves as the tip on the one end side of the bar-shaped part in the axis center direction. As the electronic pen 11, in this first embodiment, an electronic pen of the electromagnetic induction system is used as an example. However, the electronic pen 11 is not limited to those of the electromagnetic induction system and may be an electronic pen of the capacitive coupling system.

The electronic pen 11 may of course be disposed to be monolithic with or fixed to the three-dimensional position indicator 10 without being allowed to be inserted and removed. That is, the bar-shaped part may be disposed to be monolithic with or fixed to the three-dimensional position indicator 10. A detailed description of a configuration example of the three-dimensional position indicator 10 will be made later.

In this example, the digitizer 20 includes a casing 21 with a thin rectangular parallelepiped shape, and a surface thereof is used as an input surface 21S for position indication by the pen tip 11a of the electronic pen 11 of the three-dimensional position indicator 10. In addition, the digitizer 20 includes a position detecting sensor 22 and a position detecting circuit 23 (see FIG. 2).

Although diagrammatic representation is omitted, the position detecting sensor 22 is configured through disposing of each of plural loop coils in the horizontal direction of the casing of the digitizer 20 (X-axis direction) and the vertical direction of the casing (Y-axis direction). Although diagrammatic representation is omitted, the electronic pen 11 of the three-dimensional position indicator 10 includes a resonant circuit (diagrammatic representation is omitted) including a coil and a capacitor, on the side of the pen tip 11a. Through electromagnetic induction coupling between the loop coils of the position detecting sensor 22 of the digitizer 20 and the resonant circuit of the electronic pen 11, interaction is carried out between the electronic pen 11 and the position detecting sensor 22 of the digitizer 20 and transfer of signals is carried out. In this example, the digitizer 20 of the electromagnetic induction system is used in conformity with the electronic pen 11. However, in the case of the capacitive coupling system, the digitizer 20 carries out interaction with the electronic pen by capacitive coupling.

The position detecting circuit 23 of the digitizer 20 supplies a signal to the electronic pen 11 through the loop coil of the position detecting sensor 22. In addition, the position detecting circuit 23 receives a signal fed back from the electronic pen 11 through the loop coil and detects the position indicated by the pen tip 11a of the electronic pen 11 in the detection region of the position detecting sensor 22, based on the received signal. In this embodiment, the digitizer 20 is configured to detect the position indicated by the pen tip 11a of the electronic pen 11 as the indicated position of the electronic pen 11.

In the digitizer 20 of this example, the plural loop coils of the sensor 22 are disposed to cover almost the whole area of the input surface 21S.

Moreover, in this embodiment, the position detection region in which the indicated position of the electronic pen 11 can be detected by the digitizer 20 includes not only a planar region when the pen tip 11a of the electronic pen 11 is in contact with the input surface 21S of the digitizer 20 but also a spatial region (hover region of the hover state of the electronic pen 11) in which the indicated position of the electronic pen 11 can be detected through transfer of signals by electromagnetic coupling although the pen tip 11a of the electronic pen 11 is not in contact with the input surface 21S of the digitizer 20 and is separate from the input surface 21S in the direction orthogonal to this input surface 21S (Z-axis direction orthogonal to X-axis direction and Y-axis direction).

Figure 3:
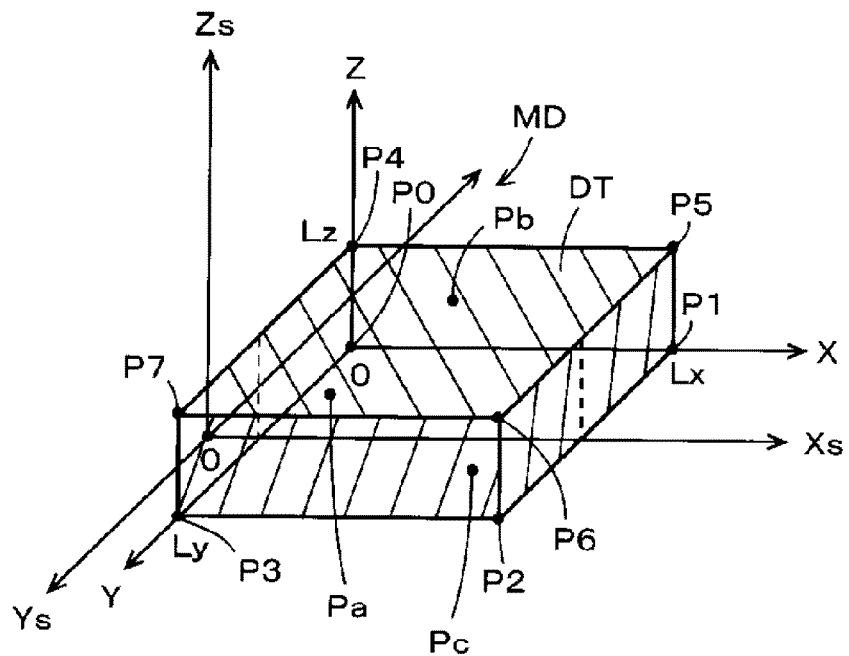
FIG. 3 is a diagram for explaining a spatial coordinate system in a spatial position indication system according to the first embodiment of the disclosure.

FIG. 3 is a diagram for explaining the detection spatial region of the indicated position of the electronic pen 11 of the three-dimensional position indicator 10 in the digitizer 20, and a detection spatial region (three-dimensional spatial region) of a detection-target object (referred to as an object) including the three-dimensional position indicator 10 in the unit 30 for spatial position detection to be described later is also depicted.

For example, when, in FIG. 1, a position P0 of the upper left corner of the input surface 21S of the digitizer 20 is defined as coordinates ((X, Y, Z)=(0, 0, 0)) of the origin in the X-axis direction, the Y-axis direction, and the Z-axis direction, a position detection region DT in which the indicated position of the electronic pen 11 can be detected in the digitizer 20 is a planar region of the input surface 21S and a rectangular parallelepiped spatial region above this input surface 21S, depicted by being given hatched lines in FIG. 3.

Specifically, when, as depicted in FIG. 3, the length of the input surface 21S of the digitizer 20 in the X-axis direction is defined as Lx, the length thereof in the Y-axis direction is defined as Ly, and the critical height position in the Z-axis direction at and under which the hover state can be detected is defined as Lz, the region surrounded by the positions of eight coordinate points of P0 (0, 0, 0), P1 (Lx, 0, 0), P2 (Lx, Ly, 0), P3 (0, Ly, 0), P4 (0, 0, Lz), P5 (Lx, 0, Lz), P6 (Lx, Ly, Lz), and P7 (0, Ly, Lz) is the position detection region DT of the digitizer 20, as depicted in FIG. 3. In this digitizer 20, information on the indicated position of the electronic pen 11 detected in the position detection region DT is supplied to the input information processing part 41 of the spatial rendering information generating device 40.

In this example, the unit 30 for spatial position detection is configured to be capable of setting a three-dimensional spatial region in which the digitizer 20 exists and, in this three-dimensional spatial region, detecting the position of the three-dimensional position indicator 10 and the position of the digitizer 20.

The unit 30 for spatial position detection is configured to set a spatial region including the position detection region DT of the digitizer 20 as a search region and to search for objects that exist in the search region, as depicted in FIG. 3. In this embodiment, the objects detected by the unit 30 for spatial position detection are the three-dimensional position indicator 10 and the digitizer 20. In the following description, the three-dimensional spatial region (search region) set by this unit 30 for spatial position detection will be referred to as a motion detection spatial region MD, for convenience.

In this embodiment, the unit 30 for spatial position detection is one that detects the positions of the objects by optical interaction with the objects and, as depicted in FIG. 1 and FIG. 2, is configured to include two light emission tracing devices 31A and 31B and light position notifying parts (hereinafter, referred to as trackers) attached to the objects.

The trackers include a light receiving sensor that detects infrared laser light from the light emission tracing devices 31A and 31B and a light emitting part that is for notifying the light emission tracing devices 31A and 31B of reception of the infrared laser light when the reception of the infrared laser light is detected by the light receiving sensor and that is formed of an LED (Light Emitting Diode), for example. Plural light receiving sensors are disposed in each tracker so that the laser light from any direction can be received.

In this embodiment, the objects to which the trackers are mounted are the three-dimensional position indicator 10 and the digitizer 20. Specifically, in this example, a tracker 24A and a tracker 24B are mounted at the upper left corner and the lower right corner of the casing of the digitizer 20 with the thin rectangular parallelepiped shape, in order to allow notification of the spatial position and orientation of the digitizer 20 (orientation of the input surface 21S) in the motion detection spatial region MD. Since not only the position but also the direction can be detected by use of the tracker as described above, the tracker attached to the digitizer 20 may be one tracker.

Moreover, in order to give notification of the spatial position and orientation of the three-dimensional position indicator 10 in the motion detection spatial region MD, for the three-dimensional position indicator 10, a tracker 12 is mounted to the rear end side on the side opposite the side of the pen tip 11a in the axis center direction of the electronic pen 11, in this example. The tracker 12 configures a spatial position index part of the three-dimensional position indicator 10.

Further, in this example, for example, a nine-axis sensor for detecting motion and direction (orientation) is also disposed in the trackers. Further, from each of the trackers, light reception output of the light receiving sensors and output of the nine-axis sensor are supplied to the spatial rendering information generating device 40 in a wired or wireless manner or via the object to which the tracker is attached. In this case, in information from the trackers 12, 24A, and 24B, identification information of each of them is included.

In the spatial rendering information generating device 40, the posture and motion of the object to which the tracker is mounted in the three-dimensional space are detected from the light reception output of the plural light receiving sensors and/or the output of the nine-axis sensor from the tracker. To detect the posture and motion of the object to which the tracker is mounted in the three-dimensional space, it suffices that either one of the plural light receiving sensors and the nine-axis sensor is disposed in the tracker.

The two light emission tracing devices 31A and 31B have the same configuration and each include a laser light emitting part of the infrared laser light, search means that makes a search in the motion detection spatial region MD by the emitted infrared laser light, and light position detecting means that detects light emission of the light emitting parts of the trackers 12, 24A, and 24B that have received the infrared laser light.

In this case, for example, the light emission tracing device 31A makes a search by the infrared laser light in such a manner as to scan the inside of the motion detection spatial region MD in the horizontal direction and to move the position of the scanning in the horizontal direction sequentially in the vertical direction by a predetermined pitch τX. Moreover, the light emission tracing device 31B makes a search by the infrared laser light in such a manner as to scan the inside of the motion detection spatial region MD in the vertical direction and to move the position of the scanning in the vertical direction sequentially in the horizontal direction by a predetermined pitch τY.

Each of the trackers 12, 24A, and 24B monitors light reception of the infrared laser light by the light receiving sensors and lights the light emitting part formed of the LED when detecting light reception of the infrared laser light.

The light emission tracing devices 31A and 31B detect light emission of the light emitting parts of the trackers 12, 24A, and 24B to thereby detect the positions of the objects to which these trackers 12, 24A, and 24B are mounted in the motion detection spatial region MD. The light emission tracing devices 31A and 31B are configured to be capable of, when detecting light emission of the light emitting part of the tracker 12, 24A, or 24B, detecting also the elapsed clock time from the emission clock time of the emitted infrared laser at the time of this detection. In this case, each of the trackers 12, 24A, and 24B carries out different light emission according to its own identification information.

This allows the unit 30 for spatial position detection to detect the positions of the trackers 12, 24A, and 24B attached to the objects (i.e., positions of the objects) in the motion detection spatial region MD with precision according to the predetermined pitch τX and the predetermined pitch τY.

The two light emission tracing devices 31A and 31B are connected to the spatial rendering information generating device 40 in a wired or wireless manner and notify the spatial rendering information generating device 40 of spatial position information in the motion detection spatial region MD regarding the detected trackers 12, 24A, and 24B. In this case, in information from the two light emission tracing devices 31A and 31B, identification information of each of them is included.

In this example, the spatial position information in the motion detection spatial region MD regarding the trackers 12, 24A, and 24B detected by the two light emission tracing devices 31A and 31B is supplied to a spatial position detecting circuit 410 of the input information processing part 41 of the spatial rendering information generating device 40 as depicted in FIG. 2.

As described above, the light reception output of the light receiving sensors and the detection output of the nine-axis sensor from the trackers 12, 24A, and 24B are also supplied to the spatial position detecting circuit 410 of the input information processing part 41 of the spatial rendering information generating device 40.

In this example, the spatial position detecting circuit 410 includes a position indicator detecting circuit 4101, an indicated position calculating circuit 4102, and a digitizer detecting circuit 4103. In addition, in this example, the spatial position detecting circuit 410 includes an operation information detecting circuit 4104 that detects operation information of an operation part disposed in the three-dimensional position indicator 10, as described below. The operation information detected by the operation information detecting circuit 4104 is supplied from the three-dimensional position indicator 10 to the spatial position detecting circuit 410 of the spatial rendering information generating device 40 together with the light reception output of the light receiving sensors and the output of the nine-axis sensor.

The position indicator detecting circuit 4101 detects the position of the three-dimensional position indicator 10 in the motion detection spatial region MD by position information detected by the light emission tracing devices 31A and 31B through optical interaction with the tracker 12 of the three-dimensional position indicator 10. In addition, the position indicator detecting circuit 4101 detects the posture of the three-dimensional position indicator 10 including the direction in which the three-dimensional position indicator 10 is oriented in the motion detection spatial region MD from the light reception output of the light receiving sensors and the detection output of the nine-axis sensor from the tracker 12. In this case, in the posture of the three-dimensional position indicator 10, the axis center direction of the electronic pen 11 as the bar-shaped part and the rotation direction position (rotation angle) around this axis center direction are included.

The information on the position of the three-dimensional position indicator 10 and the information on the posture of the three-dimensional position indicator 10 including the direction in which the three-dimensional position indicator 10 is oriented, which are detected by the position indicator detecting circuit 4101, are supplied to the indicated position calculating circuit 4102. Here, the indicated position of the three-dimensional position indicator 10 is the position of the pen tip 11a of the electronic pen 11 and is different from the position of the three-dimensional position indicator 10 detected by the position indicator detecting circuit 4101. As described later, in the three-dimensional position indicator 10, the pen tip 11a of the electronic pen 11 is attached and configured to be in specific positional relation and directional relation with the position and direction of the three-dimensional position indicator 10 detected by the position indicator detecting circuit 4101 of the spatial position detecting circuit 410.

In the indicated position calculating circuit 4102, correction information with which the position indicated by the pen tip 11a of the electronic pen 11 is detected from the information on the position and the information on the direction regarding the three-dimensional position indicator 10 detected by the position indicator detecting circuit 4101 from the above-described specific positional relation and directional relation is stored in a correction memory 4102M.

The indicated position calculating circuit 4102 calculates and outputs the position indicated by the pen tip 11a of the electronic pen 11 from the information on the position and the information on the direction regarding the three-dimensional position indicator 10 detected by the position indicator detecting circuit 4101 and the correction information stored in the correction memory 4102M. Moreover, based on the information on the posture of the three-dimensional position indicator 10 detected by the position indicator detecting circuit 4101, the indicated position calculating circuit 4102 calculates the orientation of the axis center direction of the electronic pen 11 (tilt of the electronic pen 11) and calculates the rotation and motion of the electronic pen 11 to output the calculated information as information on the posture of the electronic pen 11.

Further, the digitizer detecting circuit 4103 of the spatial position detecting circuit 410 detects the position of the digitizer 20 in the motion detection spatial region MD by position information detected by the light emission tracing devices 31A and 31B through optical interaction with the trackers 24A and 24B. Further, the digitizer detecting circuit 4103 detects the posture of the digitizer 20 including the direction in which the input surface 21S of the digitizer 20 is oriented in the motion detection spatial region MD from the light reception output of the light receiving sensors and the detection output of the nine-axis sensor from the trackers 24A and 24B, and outputs information on the detected posture together with information on the position.

In addition, the operation information detecting circuit 4104 detects and outputs the operation information of the operation part of the three-dimensional position indicator 10.

In the input information processing part 41, information to be supplied to the display image generating part 42 is generated from the information on the position indicated by the pen tip 11a of the electronic pen 11 of the three-dimensional position indicator 10 in the position detection region DT, which is detected by the digitizer 20 in the above-described manner, and the information on the position (indicated position) of the pen tip 11a of the electronic pen 11 of the three-dimensional position indicator 10 in the motion detection spatial region MD, the information on the posture of the electronic pen 11, the information on the posture of the three-dimensional position indicator 10, and the operation information, which are detected by the above-described spatial position detecting circuit 410. Then, the input information processing part 41 supplies the generated information to the display image generating part 42.

In this embodiment, as depicted in FIG. 2, the display image generating part 42 includes a rendering image generating circuit 421 for generating a 3D rendering image and a VR image generating circuit 422 for generating a VR image to be displayed on the HMD 50. Hereinafter, processing relating to generation of a 3D rendering image in the rendering image generating circuit 421 will be referred to as 3D rendering-related processing. In addition, processing relating to generation of a VR image in the VR image generating circuit 422 will be referred to as VR image-related processing. In this embodiment, on the HMD 50, a 3D rendering image rendered in the motion detection spatial region MD including the position detection region DT of the digitizer 20 is displayed as a virtual display image and virtual display images of the electronic pen 11 of the three-dimensional position indicator 10 and the digitizer 20 are displayed.

The rendering image generating circuit 421 generates a 3D rendering image, based on information on the position indication by the pen tip 11a of the electronic pen 11 of the three-dimensional position indicator 10 and the posture of the electronic pen 11. In addition, the rendering image generating circuit 421 performs processing of deformation, rotation, movement, and so forth of the 3D rendering image, based on gesture made by the operator of the three-dimensional position indicator 10. In the display image generating part 42, as depicted in FIG. 2, a gesture detection processing circuit 423 for detecting a gesture made by the operator of the three-dimensional position indicator 10 is disposed. The detection result of the gesture in this gesture detection processing circuit 423 is supplied to the rendering image generating circuit 421. The gesture detection processing circuit 423 detects the gesture made by the operator of the three-dimensional position indicator 10 from change in the position and change in the posture regarding the three-dimensional position indicator 10.

The VR image generating circuit 422 of the display image generating part 42 generates a VR image to be displayed on the HMD 50. As the VR image, in this embodiment, a VR image of the electronic pen 11, a VR image of the digitizer 20, and a VR image of the 3D rendering image generated by the rendering image generating circuit 421 are included. A VR image of the three-dimensional position indicator 10 including the electronic pen 11 may be generated.

The input information processing part 41 generates information for the rendering-related processing and information for the VR image-related processing such as the pieces of information described above, from information from the digitizer 20 and information from the unit 30 for spatial position detection, and supplies the pieces of information to the display image generating part 42.

In this case, when the position of the pen tip 11a of the electronic pen 11 of the three-dimensional position indicator 10 exists in the position detection region DT, the input information processing part 41 supplies, to the VR image generating circuit 422 of the display image generating part 42, information on the position indicated by the pen tip 11a of the electronic pen 11 of the three-dimensional position indicator 10 detected by the digitizer 20, which can detect the position of the pen tip 11a of the electronic pen 11 with higher accuracy than the unit 30 for spatial position detection.

Moreover, when the position of the pen tip 11a of the electronic pen 11 of the three-dimensional position indicator 10 exists in a space other than the position detection region DT, the input information processing part 41 supplies information on the position of the pen tip 11a of the electronic pen 11 of the three-dimensional position indicator 10 detected by use of the unit 30 for spatial position detection to the VR image generating circuit 422 of the display image generating part 42. That is, the input information processing part 41 switches the information on the indicated position of the three-dimensional position indicator 10, according to which of the position detection region DT and the motion detection spatial region MD the pen tip 11a of the electronic pen 11 of the three-dimensional position indicator 10 exists in, and supplies the information to the display image generating part 42.

Furthermore, in this embodiment, the input information processing part 41 supplies, to the rendering image generating circuit 421 and the VR image generating circuit 422 of the display image generating part 42, information on the posture including the tilt and rotation of the electronic pen 11 calculated by the indicated position calculating circuit 4102 from the information on the posture of the three-dimensional position indicator 10 detected by use of the unit 30 for spatial position detection in the above-described manner, irrespective of the spatial position at which the pen tip 11a of the electronic pen 11 exists.

[Coordinate Transformation Between Spatial Coordinate Systems in which Indicated Position of Three-Dimensional Position Indicator 10 is Detected]

Incidentally, in this embodiment, the spatial coordinate system of the position detection region DT of the digitizer 20 and the spatial coordinate system of the motion detection spatial region MD of the unit 30 for spatial position detection can independently be set as depicted in FIG. 3.

As described above, in this embodiment, in each of the 3D rendering-related processing and the VR image-related processing, information on the spatial coordinate system of the position detection region DT of the digitizer 20 and information on the spatial coordinate system of the motion detection spatial region MD of the unit 30 for spatial position detection are mutually used. In this case, there is no problem if the two spatial coordinate systems can completely be made common. However, they can each be independently set as described above and therefore, a point to be described below needs to be taken into consideration.

In FIG. 3, the three axes of the spatial coordinate system of the motion detection spatial region MD are defined as Xs-axis, Ys-axis, and Zs-axis with use of a suffix s and are depicted with discrimination from X-axis, Y-axis, and Z-axis of the spatial coordinate system of the detection region DT of the digitizer 20. In FIG. 3, for convenience, the direction of each of the Xs-axis, the Ys-axis, and the Zs-axis is depicted as the same direction as the direction of a respective one of the X-axis, the Y-axis, and the Z-axis. However, the direction of each of the Xs-axis, the Ys-axis, and the Zs-axis could be different from the direction of the respective one of the X-axis, the Y-axis, and the Z-axis because of the tilt of the input surface 21S and so forth when the digitizer 20 disposed in the motion detection spatial region MD is set.

However, in this embodiment, the digitizer 20 is disposed in the motion detection spatial region MD of the unit 30 for spatial position detection and the spatial coordinate system of the motion detection spatial region MD of the unit 30 for spatial position detection is configured to include at least part of the spatial coordinate system of the position detection region DT of the digitizer 20 as a common region. In this embodiment, the configuration is made in such a manner that, for the information on the position indicated by the pen tip 11a of the electronic pen 11 of the three-dimensional position indicator 10, coordinate transformation is carried out with use of spatial position correction information to be described below, by using a common region between the spatial coordinate system of the position detection region DT and the spatial coordinate system of the motion detection spatial region MD.

In this case, if the direction of each of the Xs-axis, the Ys-axis, and the Zs-axis is the same direction as the direction of the respective one of the X-axis, the Y-axis, and the Z-axis, the spatial coordinate system of the position detection region DT and the spatial coordinate system of the motion detection spatial region MD can be treated as one spatial coordinate system in common, by considering the difference between the origin positions of the two spatial coordinate systems. Specifically, for example, when offset values of the X-axis direction, the Y-axis direction, and the Z-axis direction between the origin position of the spatial coordinate system of the position detection region DT and the origin position of the spatial coordinate system of the motion detection spatial region MD are defined as OFSx, OFSy, and OFSz, respectively, coordinate values (Xs, Ys, Zs) of the spatial coordinate system of the motion detection spatial region MD can be transformed to coordinate values (X, Y, Z) of the spatial coordinate system of the position detection region DT by obtaining Xs−OFSx (=X), Ys−OFSy (=Y), and Zs−OFSz (=Z).

However, in the spatial position indication system of this first embodiment, as described above, the direction of each of the X-axis, the Y-axis, and the Z-axis could be different from the direction of a respective one of the Xs-axis, the Ys-axis, and the Zs-axis between the spatial coordinate system of the position detection region DT of the digitizer 20 and the spatial coordinate system of the motion detection spatial region MD of the unit 30 for spatial position detection, which are independently set. Moreover, also when the direction of each of the X-axis, the Y-axis, and the Z-axis is the same as the direction of the respective one of the Xs-axis, the Ys-axis, and the Zs-axis, it is difficult to correctly define the offset values of the origin position, and the offset values could differ for each spatial position indication system.

In this case, the coordinate positions in the two spatial coordinate systems differ. As such, when switching is carried out between the two spatial coordinate systems, i.e., the spatial coordinate system of the position detection region DT of the digitizer 20 and the spatial coordinate system of the motion detection spatial region MD of the unit 30 for spatial position detection, the coordinates of the position of the pen tip 11a of the electronic pen 11 possibly change in such a manner as jumping in the display screen of the HMD 50, for example. If this occurs, the user who is trying to input a rendering image is forced to indicate the indicated position again, which is inconvenient.

As such, in this embodiment, by using the fact that at least a partial region of the position detection region DT of the digitizer 20 is a spatial region in common with the motion detection spatial region MD of the unit 30 for spatial position detection, correction information for deviation between the spatial coordinate system of the position detection region DT and the spatial coordinate system of the motion detection spatial region MD is generated to carry out coordinate transformation. In this example, coordinate values resulting from correction of the deviation between the two spatial coordinate systems are allowed to be obtained by transforming the coordinate values (Xs, Ys, Zs) of the spatial coordinate system of the motion detection spatial region MD detected by use of the unit 30 for spatial position detection to the coordinate values (X, Y, Z) of the spatial coordinate system of the position detection region DT of the digitizer 20. The correction information for the transformation will be described next.

[Math. 1]

$$\begin{bmatrix} X \\ Y \\ Z \end{bmatrix} \begin{bmatrix} a_{11} & a_{12} & a_{13} \\ a_{21} & a_{22} & a_{23} \\ a_{31} & a_{32} & a_{33} \end{bmatrix} \begin{bmatrix} Xs \\ Ys \\ Zs \end{bmatrix} \quad \text{(Expression 1)}$$

(Expression 1) is an expression with a matrix for linear transformation of the coordinate values (Xs, Ys, Zs) of the spatial coordinate system of the motion detection spatial region MD detected by use of the unit 30 for spatial position detection to the coordinate values (X, Y, Z) of the spatial coordinate system of the position detection region DT of the digitizer 20. This matrix has three rows and three columns, and elements thereof are represented by $a_{ij}$ (i, j=1, 2, 3).

In this first embodiment, by using the fact that at least part of the position detection region DT of the digitizer 20 is a spatial region in common with the motion detection spatial region MD of the unit 30 for spatial position detection, the correction information for transformation between the spatial coordinate system of the position detection region DT and the spatial coordinate system of the motion detection spatial region MD is generated.

Specifically, as depicted in FIG. 3, the position is specified regarding at least three points Pa, Pb, and Pc in the spatial region common to the position detection region DT of the digitizer 20 and the motion detection spatial region MD of the unit 30 for spatial position detection, and the coordinate values (X, Y, Z) of the spatial coordinate system of the position detection region DT of the digitizer 20 and the coordinate values (Xs, Ys, Zs) of the spatial coordinate system of the motion detection spatial region MD of the unit 30 for spatial position detection regarding each point are acquired from each device. Ideally, the coordinate values acquired from these devices are the same values. However, normally these coordinate values do not correspond if calibration is not carried out. In general, the accuracy of position detection by the digitizer 20 is higher than the accuracy of position detection by use of the unit 30 for spatial position detection. Therefore, it is preferable to adjust the coordinate values of the spatial coordinate system of the motion detection spatial region MD of the unit 30 for spatial position detection to the coordinate values of the spatial coordinate system of the position detection region DT of the digitizer 20.

Per one point regarding which the position has been specified in the common region, three equations are obtained when the corresponding coordinate values (X, Y, Z) of the spatial coordinate system of the position detection region DT and the corresponding coordinate values (Xs, Ys, Zs) of the spatial coordinate system of the motion detection spatial region MD are substituted into expression 1. By carrying out position specifying of at least three points in the common region, at least nine equations regarding $a_{11}$ to $a_{33}$ are obtained and therefore, the value of each of $a_{11}$ to $a_{33}$ can be obtained. Moreover, the transformation between the spatial coordinate system of the position detection region DT and the spatial coordinate system of the motion detection spatial region MD is not limited to the above-described method. Learning based on machine learning regarding the coordinate values of at least three points in the common region, calibration by the user, and so forth may be used.

In the above-described manner, in the spatial position indication system of this embodiment, deviation between the spatial coordinate system of the position detection region DT of the digitizer 20 and the spatial coordinate system of the motion detection spatial region MD of the unit 30 for spatial position detection is corrected to allow the spatial coordinate systems to be treated as one common coordinate system. This correction processing is performed in the input information processing part 41.

Thus, in a displayed image of the HMD 50, even when information on the indicated position of the electronic pen 10 is switched between the spatial coordinate system of the position detection region DT of the digitizer 20 and the spatial coordinate system of the motion detection spatial region MD of the unit 30 for spatial position detection, since the two systems are allowed to be treated as one common coordinate system, for example, the state in which the position indicated by the pen tip 11a of the electronic pen 11 changes does not occur.

[Switching of Spatial Coordinate System in which Indicated Position of Three-Dimensional Position Indicator 10 is Detected]

In the spatial position indication system of the first embodiment, the configuration is made to have at least part of the position detection region DT of the digitizer 20 as a common region in the motion detection spatial region MD of the unit 30 for spatial position detection.

Moreover, in the spatial position indication system of this embodiment, according to the separation distance of the position of the pen tip 11a of the electronic pen 11 of the three-dimensional position indicator 10 in the space of the motion detection spatial region MD from the input surface 21S of the sensor 22 of the digitizer 20, switching is carried out regarding whether the coordinates of the indicated position of the pen tip 11a of the electronic pen 11 of the three-dimensional position indicator 10 detected by the digitizer 20 are used or the coordinates of the indicated position of the pen tip 11a of the electronic pen 11 of the three-dimensional position indicator 10 detected by the unit 30 for spatial position detection are used.

In this embodiment, a separation distance (separation distance in the Z-axis direction) θth from the input surface 21S serving as the switching point is set equal to or shorter than a critical height distance Lz in the Z-axis direction at and under which the digitizer 20 can detect the hover state of the electronic pen 11 of the three-dimensional position indicator 10. In this example, as depicted in FIG. 4, the separation distance θth from the input surface 21S serving as the switching point is set equal to the critical height distance Lz in the Z-axis direction at and under which the digitizer 20 can detect the hover state of the electronic pen 11 of the three-dimensional position indicator 10, i.e., the length Lz of the position detection region DT in the Z-axis direction.

Figure 4:
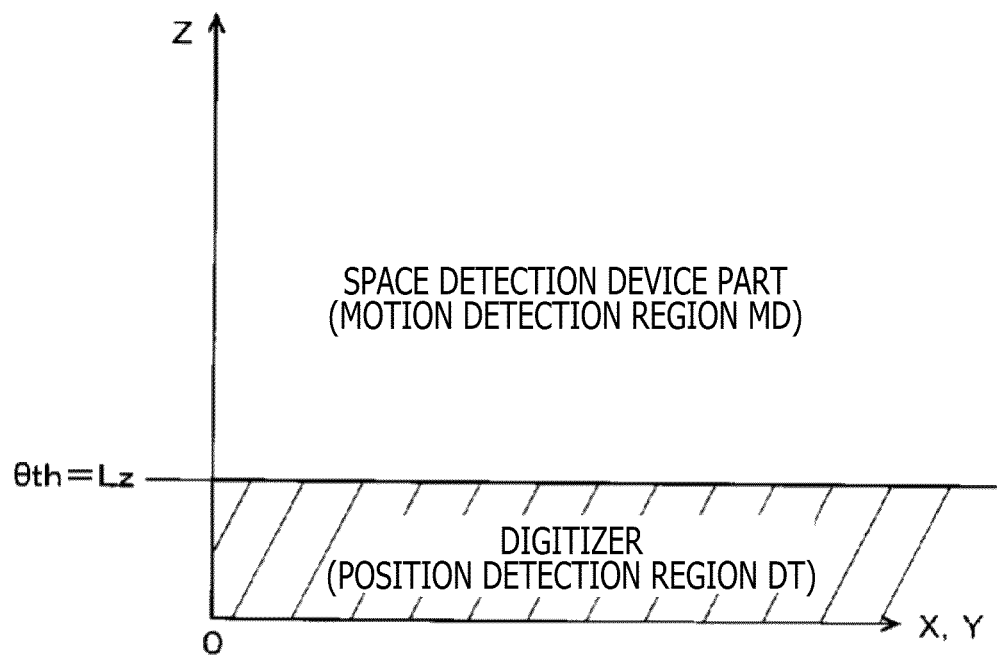
FIG. 4 is a diagram for explaining switching of a coordinate system for position detection of an electronic pen in the spatial position indication system according to the first embodiment of the disclosure.

Specifically, in the spatial position indication system of this embodiment, as depicted in FIG. 4, when the separation distance of the pen tip 11a of the electronic pen 11 of the three-dimensional position indicator 10 from the input surface 21S is equal to or shorter than θth, information on the position indicated by the pen tip 11a of the electronic pen 11 of the three-dimensional position indicator 10 detected by the digitizer 20 in the position detection region DT thereof is used.

Moreover, in the spatial position indication system of this embodiment, as depicted in FIG. 4, when the separation distance of the pen tip 11a of the electronic pen 11 of the three-dimensional position indicator 10 from the input surface 21S is longer than θth, information on the position indicated by the pen tip 11a of the electronic pen 11 of the three-dimensional position indicator 10 detected by use of the unit 30 for spatial position detection is used.

In this embodiment, the signal level (signal intensity) of a received signal from the electronic pen 11 in the sensor 22 of the digitizer 20 becomes a value according to the separation distance and therefore, the separation distance (separation distance in the Z-axis direction) of the position of the pen tip 11a of the electronic pen 11 of the three-dimensional position indicator 10 from the input surface 21S of the sensor 22 of the digitizer 20 is detected in the input information processing part 41 on the basis of the signal level of the received signal from the electronic pen 11 obtained from the digitizer 20.

[Switching Processing in Input Information Processing Part 41]

Next, a configuration example of the input information processing part 41 in FIG. 2 configured to realize the above will be described. Specifically, the position detecting circuit 23 configuring the digitizer 20 supplies detection output of the indicated position of the pen tip 11a of the electronic pen 11 of the three-dimensional position indicator 10 to a selection circuit 411 as one input signal thereof and supplies the detection output to a selection circuit 412 as one input signal thereof. In this information supplied from the position detecting circuit 23 to the selection circuits 411 and 412, information on the writing pressure applied to the pen tip 11a of the electronic pen 11 is included in addition to the detection output of the indicated position of the pen tip 11a of the electronic pen 11.

Moreover, the indicated position calculating circuit 4102 of the spatial position detecting circuit 410 supplies detection output of the spatial position of the pen tip 11a of the electronic pen 11 of the three-dimensional position indicator 10 (indicated position of the electronic pen 11) to a coordinate transformation circuit 413. The coordinate transformation circuit 413 stores the elements $a_{11}$ to $a_{33}$ of the matrix of three rows and three columns in the above-described (Expression 1) and transforms information on the spatial coordinate system of the motion detection spatial region MD of the unit 30 for spatial position detection to information on the spatial coordinate system of the position detection region DT of the digitizer 20 by carrying out arithmetic operation of the above-described (Expression 1). Then, the coordinate transformation circuit 413 supplies coordinate output obtained after the transformation to the selection circuits 411 and 412 as the other input signal thereof.

Further, in this embodiment, the position detecting circuit 23 of the digitizer 20 supplies information on the signal level of the received signal from the electronic pen 10 to a selection control signal generating circuit 414. The selection control signal generating circuit 414 detects the separation distance of the pen tip 11a of the electronic pen 11 of the three-dimensional position indicator 10 from the input surface 21S of the digitizer 20 from the signal level of the received signal from the electronic pen 10, and generates a selection control signal SE on the basis of the detected separation distance from the input surface 21S. The generated selection control signal SE is supplied to the selection circuits 411 and 412.

Further, by the selection control signal SE, the selection circuits 411 and 412 are controlled to select the position detection output from the position detecting circuit 23 of the digitizer 20 when the separation distance of the pen tip 11a of the electronic pen 11 from the input surface 21S of the digitizer 20 is equal to or shorter than the critical height Lz in the Z-axis direction at and under which the digitizer 20 can detect the hover state of the electronic pen 11, and are controlled to select the output from the coordinate transformation circuit 413 when the separation distance is longer than the above-described critical height Lz.

Further, the information on the indicated position of the pen tip 11a of the electronic pen 11 of the three-dimensional position indicator 10 from the selection circuit 411 is supplied to the rendering image generating circuit 421 for the 3D rendering-related processing and the gesture detection processing circuit 423. In addition, the information on the indicated position of the pen tip 11a of the electronic pen 11 of the three-dimensional position indicator 10 from the selection circuit 412 is supplied to the VR image generating circuit 422 for the VR image-related processing.

Furthermore, information on the posture of the electronic pen 11 from the indicated position calculating circuit 4102 of the spatial position detecting circuit 410 and operation information of the operation part of the three-dimensional position indicator 10 from the operation information detecting circuit 4104 are supplied to each of the rendering image generating circuit 421, the gesture detection processing circuit 423, and the VR image generating circuit 422. In addition, position information and posture information of the digitizer 20 from the digitizer detecting circuit 4103 are supplied to each of the rendering image generating circuit 421 and the VR image generating circuit 422. As described below, in the rendering image generating circuit 421, the posture information of the digitizer 20 is used to transform the information on the posture of the electronic pen 11 to information on the relative posture with respect to the input surface of the digitizer 20.

[Processing Operation of Display Image Generating Part 42]

The rendering image generating circuit 421 has a pen rendering function of rendering a fine line drawing and so forth based on the detection output of the indicated position of the pen tip 11a of the electronic pen 11 and the information on the posture of the electronic pen 11 detected by the unit 30 for spatial position detection from the selection circuit 411. Moreover, the rendering image generating circuit 421 has a gesture processing function of performing rendering processing based on motion (gesture) detected by the gesture detection processing circuit 423, on the basis of the information on the spatial position of the electronic pen 11 and the posture of the electronic pen detected by the unit 30 for spatial position detection.

In this example, the selection control signal SE from the selection control signal generating circuit 414 is supplied to the rendering image generating circuit 421 and the gesture detection processing circuit 423. Accordingly, the rendering image generating circuit 421 operates to perform the pen rendering function when the position of the pen tip 11a of the electronic pen 11 of the three-dimensional position indicator 10 exists in the spatial region of the position detection region DT of the digitizer 20. Moreover, the gesture detection processing circuit 423 operates to perform gesture processing when the position of the pen tip 11a of the electronic pen 11 exists outside the spatial region of the position detection region DT of the digitizer 20.

In this case, in the rendering image generating circuit 421, the tilt included in the information on the posture of the electronic pen 11 is reflected in the thickness of the rendering line and so forth. As the tilt, the tilt with respect to the input surface 21S of the digitizer 20 needs to be used, when the position of the pen tip 11a of the electronic pen 11 exists in the position detection region DT.

However, the information on the posture of the electronic pen 11 from the indicated position calculating circuit 4102 is one that has been detected by use of the unit 30 for spatial position detection. Therefore, the information is not one that illustrates the tilt with respect to the input surface 21S of the digitizer 20 if the surface direction of the input surface 21S of the digitizer 20 deviates from the surface direction of the X-Y plane in the motion detection spatial region MD in the unit 30 for spatial position detection.

As such, the rendering image generating circuit 421 of this embodiment has a processing function of correcting the tilt of the electronic pen 11 detected in the coordinate system of the motion detection spatial region MD of the spatial position detecting circuit 410 to the relative tilt with respect to the input surface of the digitizer 20, by using the posture information of the digitizer 20 from the digitizer position detecting circuit 4103.

Moreover, the rendering image generating circuit 421 and the gesture detection processing circuit 423 also perform processing based on the operation information of the operation part of the three-dimensional position indicator 10 from the operation information detecting circuit 4104.

The VR image generating circuit 422 of the display image generating part 42 generates a VR image of the electronic pen 11 by using the information on the position of the pen tip 11a of the electronic pen 11 of the three-dimensional position indicator 10 and the information on the posture of the electronic pen 11 from the selection circuit 412. This VR image of the electronic pen 11 is generated in such a manner that the position of the pen tip 11a of the electronic pen 11 is displayed at the detected indicated position.

In this case, the information on the indicated position of the pen tip 11a of the electronic pen 11 from the spatial position detecting circuit 410 is subjected to coordinate transformation by the coordinate transformation circuit 413 so as to become information on the same indicated position as the digitizer 20. Thus, the information on the position of the pen tip 11a of the electronic pen 11 of the three-dimensional position indicator 10 from the selection circuit 412 does not change when switching is carried out in the selection circuit 412 based on the selection control signal SE. Therefore, display deviation such as movement of the display position of the VR image of the electronic pen 11 in a jumping manner does not occur.

Further, in this embodiment, the VR image generating circuit 422 generates a VR image of the digitizer 20, based on the information on the position and posture of the digitizer 20 from the digitizer detecting circuit 4103, and displays the VR image in the motion detection spatial region MD. Moreover, the VR image generating circuit 422 further accepts the operation information of the operation part of the three-dimensional position indicator 10 from the operation information detecting circuit 4104 to carry out VR displaying of a menu regarding 3D rendering and to display a VR image of operation buttons, for example. In the rendering image generating circuit 421, the positions of these VR images of the menu and the operation buttons in the motion detection spatial region MD are recognized, and whether or not the pen tip 11a of the electronic pen 11 of the three-dimensional position indicator 10 has indicated (same as click) these VR image positions can be detected so that corresponding processing can be performed.

Furthermore, the 3D rendering image information generated in the rendering image generating circuit 421 in the above-described manner is supplied to the VR image generating circuit 422 and is turned to a VR image. This VR image is supplied to the HMD 50 through a display drive circuit 424 and is displayed together with the above-described VR image.

[Configuration Example of Three-Dimensional Position Indicator 10]

Figure 5:
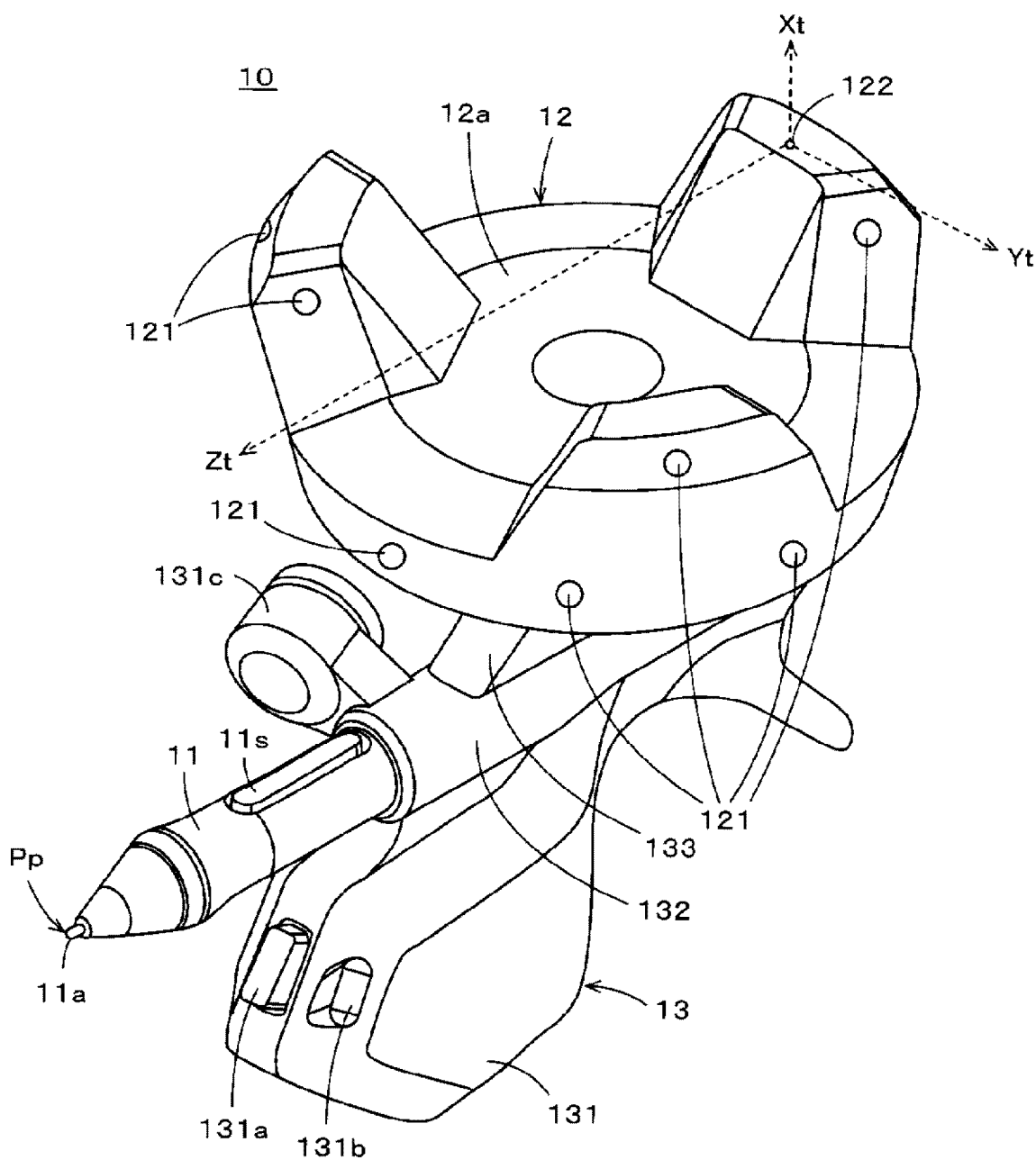
FIG. 5 is a perspective view illustrating the appearance of a three-dimensional position indicator according to the first embodiment of the disclosure.

Next, a configuration example of the three-dimensional position indicator 10 of this embodiment will be described with reference to FIG. 5 to FIG. 7. FIG. 5 is a perspective view illustrating the appearance of the three-dimensional position indicator 10 of this embodiment. In addition, FIGS. 6A, 6B, and 6C depict diagrams for explaining constituent parts of the three-dimensional position indicator 10 of this embodiment and assembly thereof.

Figure 6A:
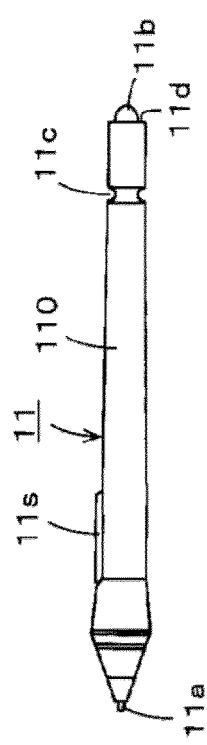
FIGS. 6A, 6B, and 6C depict diagrams for explaining a configuration example of the three-dimensional position indicator according to the first embodiment of the disclosure.

The three-dimensional position indicator 10 of this embodiment includes the electronic pen 11 depicted in FIG. 6A and a holder 13 that configures a grip part gripped by a user. The tracker 12 that configures the spatial position index part is mounted to the holder 13.

Figure 6B:
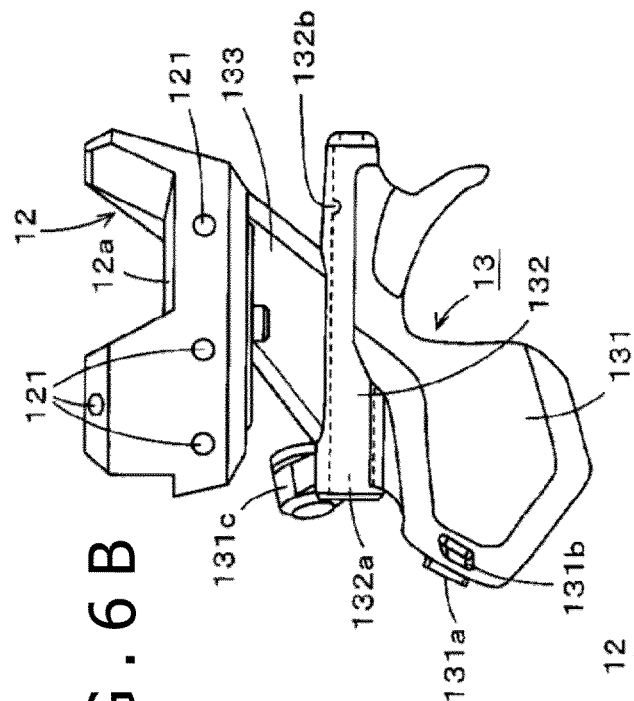

In the electronic pen 11 in this example, as depicted in FIG. 6B, the tip part of a core body protrudes as the pen tip 11a from one opening side of a bar-shaped casing 110 with a circular cylindrical shape in the axis center direction. Although diagrammatic representation is omitted, a coil wound around a ferrite core in a well-known manner is disposed in the vicinity of the pen tip 11a in a hollow part of the circular cylindrical casing 110 of the electronic pen 11. In addition, a capacitor connected in parallel to the coil to configure a resonant circuit is disposed on a printed circuit board disposed in the hollow part. Moreover, in the electronic pen 11 in this example, a side switch 11s that controls the on/off-state of the capacitor for changing the frequency of the resonant circuit is disposed to be exposed from the casing 110 so as to be allowed to be operated by the user.

The holder 13 includes a grip part 131 configured to be covered by a palm part when the user grips the three-dimensional position indicator 10, an electronic pen mounting part 132, and a tracker mounting part 133.

The electronic pen mounting part 132 has a circular cylindrical shape and includes a tubular recessed hole part 132a configured in such a manner that the electronic pen 11 is inserted in the axis center direction thereof from a rear end part 11b on the side opposite the side of the pen tip 11a and is locked to the holder 13. The tubular recessed hole part 132a has such a length in the axis center direction that, when the electronic pen 11 is inserted and mounted, the electronic pen 11 is held in the state in which the side of its pen tip 11a is exposed and the side switch 11s is exposed on the outside to be operable.

Moreover, in the electronic pen 11 in this example, a ring-shaped recessed groove 11c is made on the side of the rear end part 11b in the axis center direction as depicted in FIG. 6A. In addition, in the tubular recessed hole part 132a, a ring-shaped protrusion 132b for being fitted to the ring-shaped recessed groove 11c of the electronic pen 11 to lock the electronic pen 11 in the tubular recessed hole part 132a is formed.

In this example, a step part 11d is formed on the side of the rear end part 11b of the electronic pen 11, and the configuration is made in such a manner that the ring-shaped recessed groove 11c of the electronic pen 11 is fitted to the ring-shaped protrusion 132b in the tubular recessed hole part 132a and the electronic pen 11 is locked in the tubular recessed hole part 132a of the electronic pen mounting part 132 when this step part 11d abuts against an end part of the tubular recessed hole part 132a. The configuration that locks the electronic pen 11 in the tubular recessed hole part 132a of the electronic pen mounting part 132 is not limited to the configuration in which the ring-shaped recessed groove 11c and the ring-shaped protrusion 132b are disposed as in this example. The configuration may be any configuration as long as it is a configuration that can lock the electronic pen 11 in the tubular recessed hole part 132a of the electronic pen mounting part 132 when the step part 11d on the side of the rear end part 11b of the electronic pen 11 abuts against the end part of the tubular recessed hole part 132a.

The grip part 131 is extended in a direction orthogonal to the axis center direction from the circumferential side surface of the electronic pen mounting part 132 with the circular cylindrical shape and is configured into a shape that can easily be gripped by the user. In the grip part 131, operation buttons 131a and 131b are disposed at places at which operation by a forefinger or the like is possible when the user grips the grip part 131. In addition, an operation part 131c allowed to be subjected to rotational operation and pressing-down operation by the ball of the thumb of the user is disposed. In this example of the three-dimensional position indicator 10 depicted in FIG. 5 and FIGS. 6A, 6B, and 6C, the three-dimensional position indicator 10 is depicted as one for a left-handed user and the circular operation part 131c is attached to be operable by the thumb of the left hand when the grip part 131 is gripped with the left hand.

Furthermore, the tracker mounting part 133 is attached to be extended in a direction orthogonal to the axis center direction from an angular position that is different by 180 degrees from and is on the side opposite the angular position at which the grip part 131 is formed on the circumferential side surface of the electronic pen mounting part 132 with the circular cylindrical shape. The above-described tracker 12 is set for the tracker mounting part 133. Therefore, when the user grips the grip part 131 in such a manner as to wrap it by a palm, the tracker 12 attached to the tracker mounting part 133 is located on the upper side of the back of the hand and is in the state of not being covered by the hand.

In this example, the tracker 12 is formed into a shape including three protrusions on an upper surface (flat surface) 12a of a circular-plate-shaped member as depicted in FIG. 5. In the tracker 12, as depicted in FIG. 5, FIG. 6B, and FIG. 6C, plural light receiving sensors 121 are disposed on the three protrusions and the circular-plate-shaped member so that an infrared laser can be received whichever direction the infrared laser comes from. Furthermore, on one of the three protrusions of the tracker 12, an LED 122 as a light emitting element for giving notification of reception of the infrared laser by light emission when the infrared laser is received by any of the light receiving sensors 121 is disposed. The nine-axis sensor is disposed inside the tracker 12.

Although diagrammatic representation is omitted, in the case of connecting the tracker 12 and the spatial rendering information generating device 40 in a wired manner, a connector to which a cable for connection to the spatial rendering information generating device 40 is connected is disposed in the tracker 12. Moreover, in the case of a wireless connection, communication means is disposed inside the tracker 12.

Figure 6C:
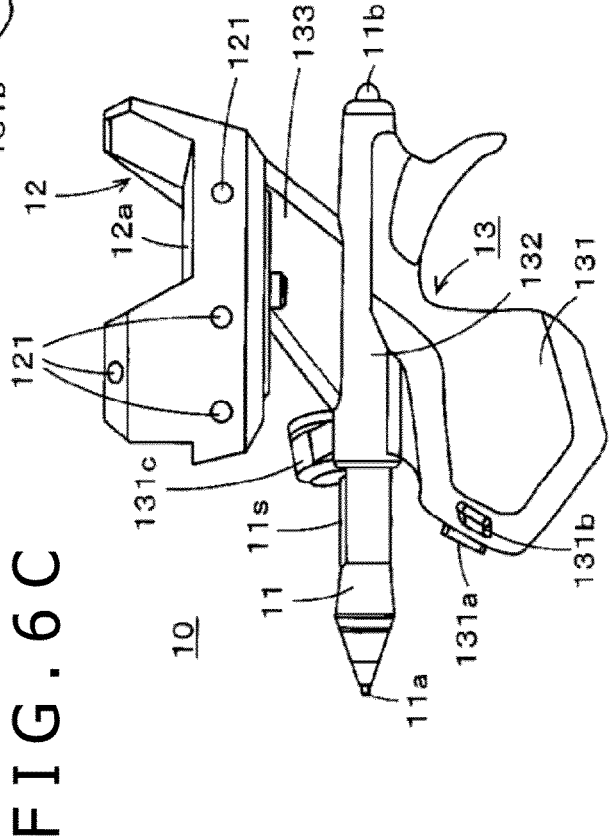

Further, in this example, as depicted in FIGS. 6B and 6C, the tracker 12 is attached in such a manner that the surface direction of the upper surface 12a of the circular-disc-shaped member (direction in which the plane including the upper surface 12a is oriented) is in the state of being orthogonal to the extension direction of the tracker mounting part 133 and is in the state of being parallel to the axis center direction of the electronic pen mounting part 132 with the circular cylindrical shape. In addition, the LED 122 is attached on the extension direction of the tracker mounting part 133.

As described above, by use of the unit 30 for spatial position detection, in the position indicator detecting circuit 4101 of the spatial position detecting circuit 410, a position Pt of the LED 122 disposed in the tracker 12 is detected as the position of the tracker 12 in the spatial coordinate system of the motion detection spatial region MD. Moreover, in the position indicator detecting circuit 4101, as described above, the surface direction of the upper surface 12a of the tracker 12 (direction in which the plane including the upper surface is oriented) is detected as the orientation (direction) of the three-dimensional position indicator 10, in this example.

As is apparent from FIG. 5, the position Pt of the tracker 12 detected by the position indicator detecting circuit 4101 of the spatial position detecting circuit 410 is different from a position Pp of the pen tip 11a of the electronic pen 11 mounted to the holder 13. However, the position Pt of the tracker 12 (position of the LED 122) detected by the position indicator detecting circuit 4101 of the spatial position detecting circuit 410 and the position Pp of the pen tip 11a of the electronic pen 11 mounted to the holder 13 are in a specific positional relation in the three-dimensional position indicator 10.

Here, a three-dimensional coordinate system that defines the mechanical configuration of the three-dimensional position indicator 10 is configured as follows. As depicted in FIG. 5, the position Pt of the tracker 12 is defined as the origin. The direction that is parallel to the upper surface 12a of the tracker 12 and is parallel to the axis center direction of the electronic pen mounting part 132 with the circular cylindrical shape is defined as a coordinate axis Zt. The direction that is parallel to the upper surface 12a of the tracker 12 and is orthogonal to the axis center direction of the electronic pen mounting part 132 with the circular cylindrical shape is defined as a coordinate axis Yt. The direction orthogonal to the upper surface 12a of the tracker 12 (direction orthogonal to the coordinate axes Zt and Yt) is defined as a coordinate axis Xt. Since the configuration is made in this manner, the position Pt of the tracker 12 detected by the position indicator detecting circuit 4101 of the spatial position detecting circuit 410 and the position Pp of the pen tip 11a of the electronic pen 11 mounted to the holder 13 are in a positional relation as that depicted in FIG. 7.

Specifically, in the space of the coordinate axes Xt, Yt, and Zt, the position Pp of the pen tip 11a of the electronic pen 11 mounted to the holder 13 is a position that deviates from the position Pt of the tracker 12 by $-\Delta x$ in the direction of the coordinate axis Xt and deviates therefrom by $+\Delta z$ in the direction of the coordinate axis Zt. Moreover, deviation $\Delta y$ in the direction of the coordinate axis Yt is 0 ($\Delta y=0$). Therefore, by using these values as correction values COR ($=(-\Delta x, \Delta y (=0), +\Delta z)$), the position Pp of the pen tip 11a of the electronic pen 11 can be calculated from the position Pt of the tracker 12.

In this embodiment, because the three-dimensional position indicator 10 is mechanistically configured in the above-described manner, the deviation amount $\Delta x$ in the above-described Xt-axis direction and the deviation amount $\Delta z$ in the above-described Zt-axis direction can be prescribed as mechanical dimension values of the three-dimensional position indicator 10. Specifically, $\Delta x$ is obtained as the dimension from the position of the LED 122 to the position of the center axis of the electronic pen mounting part 132, and $\Delta z$ is obtained as the dimension from the position of the intersection of the position of the LED 122 and the position of the center axis of the electronic pen mounting part 132 to the tip part of the pen tip 11a of the electronic pen 11.

In this case, the position Pt of the tracker 12 detected by the spatial position detecting circuit 410 with use of the unit 30 for spatial position detection is the spatial coordinate system (Xs, Ys, Zs) in the spatial position detecting circuit 410, and that the directions of the coordinate axes of the abovementioned spatial coordinate system do not necessarily correspond with those of the three-dimensional coordinate system (Xt, Yt, Zt) that defines the above-described mechanical configuration of the three-dimensional position indicator 10 needs to be taken into consideration. This is because the three-dimensional position indicator 10 is used while being oriented in any direction by the user.

However, in this embodiment, the orientation of the three-dimensional position indicator 10 detected by the position indicator detecting circuit 4101, i.e., the direction in which the upper surface 12a of the tracker 12 is oriented (direction orthogonal to the upper surface 12a), is detected by the spatial position detecting circuit 410 by use of the unit 30 for spatial position detection. Then, when this direction in which the upper surface 12a of the tracker 12 is oriented can be detected, the directions of the respective coordinate axes of the three-dimensional coordinate system (Xt, Yt, Zt) that defines the above-described mechanical configuration of the three-dimensional position indicator 10 can be identified in the spatial coordinate system (Xs, Ys, Zs) in the spatial position detecting circuit 410.

When the directions of the respective coordinate axes of the three-dimensional coordinate system (Xt, Yt, Zt) that defines the mechanical configuration of the three-dimensional position indicator 10 can be identified in the spatial coordinate system (Xs, Ys, Zs) in the spatial position detecting circuit 410 in this manner, the indicated position of the pen tip 11a of the electronic pen 11 in the spatial coordinate system (Xs, Ys, Zs) of the spatial position detecting circuit 410 can be calculated from the position Pt of the tracker 12 detected by the position indicator detecting circuit 4101 of the spatial position detecting circuit 410, by use of the above-described correction values COR.

Based on the above, the above-described correction values COR ($=(-\Delta x, \Delta y (=0), +\Delta z)$) are stored in the correction memory 4102M included in the indicated position calculating circuit 4102 of the spatial position detecting circuit 410. Moreover, in the indicated position calculating circuit 4102, by using the orientation of the three-dimensional position indicator 10 detected by the position indicator detecting circuit 4101 and the above-described correction values COR stored in the correction memory 4102M, the indicated position of the pen tip 11a of the electronic pen 11 is calculated from the position Pt of the tracker 12 of the three-dimensional position indicator 10 in the above-described manner.

In the three-dimensional position indicator 10 depicted in FIG. 5 and FIGS. 6A, 6B, and 6C, the configuration is made in such a manner that the positional relation between the tracker 12 and the electronic pen mounting part 132 and the electronic pen 11 becomes as described above, in order to allow the correction values COR to be set easily from mechanical dimension values of the three-dimensional position indicator 10. However, the tracker 12 may be attached to the holder 13 in any state.

In this case, the correction values COR can be obtained in the following manner and be stored in the correction memory 4102M.

Specifically, in the space of the motion detection spatial region MD, through adjustment of the orientation of the tracker 12, the three-dimensional position indicator 10 is set to the state in which the directions of the respective coordinate axes of the three-dimensional coordinate system (Xt, Yt, Zt) that defines the mechanical configuration of the three-dimensional position indicator 10 correspond with the directions of the respective coordinate axes of the spatial coordinate system (Xs, Ys, Zs) in which detection is carried out by the spatial position detecting circuit 410 with use of the unit 30 for spatial position detection.

Then, the position Pp of the pen tip 11a of the electronic pen 11 of the three-dimensional position indicator 10 is detected by use of the digitizer 20, and the detected coordinate values are transformed to coordinate values of the spatial coordinate system (Xs, Ys, Zs) in which detection is carried out by the spatial position detecting circuit 410 with use of the unit 30 for spatial position detection. This transformation is the inverse transformation of the transformation depicted in Expression 1. Moreover, the position Pt of the tracker 12 of the three-dimensional position indicator 10 is detected as coordinate values of the spatial coordinate system (Xs, Ys, Zs) in which detection is carried out by the spatial position detecting circuit 410.

Then, the deviation amounts ($\Delta x$, $\Delta y$, $\Delta z$) between the coordinate values of the detected position Pt of the tracker 12 and the coordinate values of the position Pp of the pen tip 11a of the electronic pen 11 are calculated, and the calculated deviation amounts ($\Delta x$, $\Delta y$, $\Delta z$) are stored in the correction memory 4102M as the correction values COR.

This storing processing of the correction values COR into the correction memory 4102M may be performed when the spatial position detection system is constructed or may be performed later by the user as appropriate.

As described above, in the spatial position detection system of the above-described embodiment, rendering is carried out in the digitizer 20 by use of the three-dimensional position indicator 10. In addition, in the case of carrying out gesture operation or the like in the space defined by the unit 30 for spatial position detection, the position of the pen tip 11a of the electronic pen 11 of the three-dimensional position indicator 10 can always be used as the indicated position. This provides an effect that the user can carry out operation work with consistency kept from rendering to gesture.

Moreover, in the above-described first embodiment, spatial coordinates of the detection region of the digitizer 20 and spatial coordinates of the detection region of the unit 30 for spatial position detection are allowed to be treated as common coordinates. Therefore, there is a characteristic that coordinate deviation does not occur even when switching is carried out between output from the digitizer 20 and output of the unit 30 for spatial position detection, in the 3D rendering-related processing.

Therefore, the operator can carry out operation by gesture from fine rendering seamlessly by only spatially moving the electronic pen 10 over the digitizer 20 without taking heed of switching between the digitizer 20 and the unit 30 for spatial position detection.

Further, in the VR image-related processing in the above-described first embodiment, in the spatial region of the position detection region DT of the digitizer 20, position detection output of the digitizer 20, which allows higher accuracy than detection output in the unit 30 for spatial position detection and is also higher in response speed, can be used as position information of the electronic pen 11 (position information of the pen tip 11a) for generating a VR image of the electronic pen 11 of the three-dimensional position indicator 10. Thus, the VR image that precisely reacts to operation of the electronic pen 11 by the actual user is obtained.

Since the above-described spatial rendering information generating device 40 includes a computer, it goes without saying that the part of each circuit of the input information processing part 41 and the display image generating part 42 can be configured as a software functional part implemented by a software program.

In the above-described first embodiment, information on the correction values ($\Delta x$, $\Delta y$, $\Delta z$) is stored in advance in the correction memory 4102M of the indicated position calculating circuit 4102 at the time of factory shipment or the like. However, this correction memory 4102M may be set as a buffer memory, and information on the correction values may be transmitted thereto from the three-dimensional position indicator 10.

Figures 7, 8:
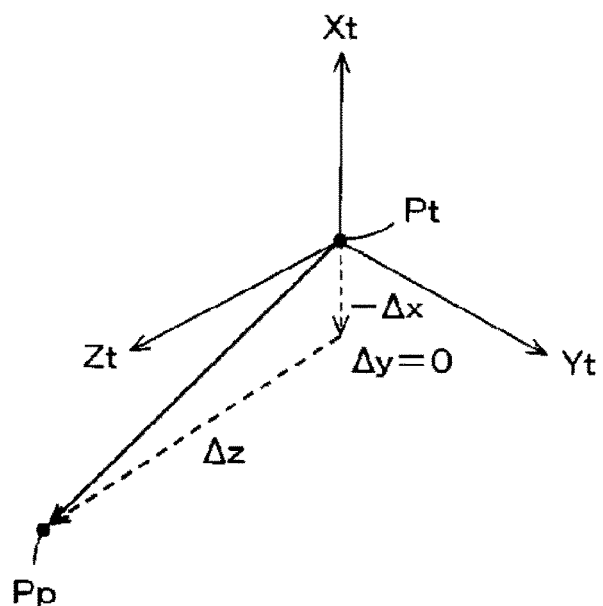
FIG. 7 is a diagram for explaining the configuration example of the three-dimensional position indicator according to the first embodiment of the disclosure.
FIG. 8 is a diagram for explaining another configuration example of the three-dimensional position indicator according to the first embodiment of the disclosure.

In this case, the configuration is made in such a manner that, for example, as depicted in FIG. 8, information on the above-described correction values ($\Delta x$, $\Delta y$, $\Delta z$) is transmitted from the three-dimensional position indicator 10 to the spatial position detecting circuit 410 in addition to information on light reception output of the light receiving sensors of the tracker 12, output information of the nine-axis sensor, and operation information of the operation buttons 131a and 131b. Moreover, in the indicated position calculating circuit 4102 of the spatial position detecting circuit 410, the position of the pen tip 11a of the electronic pen 11 is detected as the indicated position of the three-dimensional position indicator 10 by use of the correction values held in the correction memory 4102M as the buffer memory. In FIG. 8, "ID" means identification information of the three-dimensional position indicator 10.

If the configuration is made as above, it becomes possible to use what are different in the amount of deviation between the position of the tracker 12 and the position of the pen tip 11a of the electronic pen 11, as the three-dimensional position indicator used in the spatial position detection system. Further, it also becomes possible to mount plural kinds of electronic pens different in the length in the axis center direction to the three-dimensional position indicator 10. However, in this case, the correction values corresponding to each of the electronic pens different in the length dimension in the axis center direction are stored in the three-dimensional position indicator 10. In addition, the user is allowed to carry out selective setting of which correction values in them are used, according to the mounted electronic pen, by operating operation means.

In the three-dimensional position indicator 10 of the above-described first embodiment, the electronic pen 11 is allowed to be inserted and removed. However, the electronic pen 11 may be fixed to the holder 13. Moreover, instead of using the electronic pen 11 as the bar-shaped part, the bar-shaped part may be configured integrally with the holder 13 by disposing, in the bar-shaped part, the functional parts of the electronic pen 11, i.e., a coil wound around a ferrite core and a capacitor connected in parallel to this coil to configure a resonant circuit.

Second Embodiment

A second embodiment is a modification example of the above-described first embodiment. The same parts as the respective parts of the above-described first embodiment are given the same reference symbols, and description thereof is omitted.

In the three-dimensional position indicator 10 of the above-described first embodiment, the position of the pen tip 11a of the electronic pen 11 is always used as the position indicated by the three-dimensional position indicator 10. However, the configuration may be made in such a manner that the position of the tracker 12 is used as the indicated position and that use for another purpose is enabled when the electronic pen 11 is not mounted to the holder 13.

Specifically, in a three-dimensional position indicator 10A of this second embodiment, when the electronic pen 11 is mounted to a holder 13A, the position of the pen tip 11a of the mounted electronic pen 11 is used as the indicated position similarly to the first embodiment. However, when the electronic pen 11 is not mounted to the holder 13A, the position of the tracker 12 is used as the indicated position directly.

Figure 9:
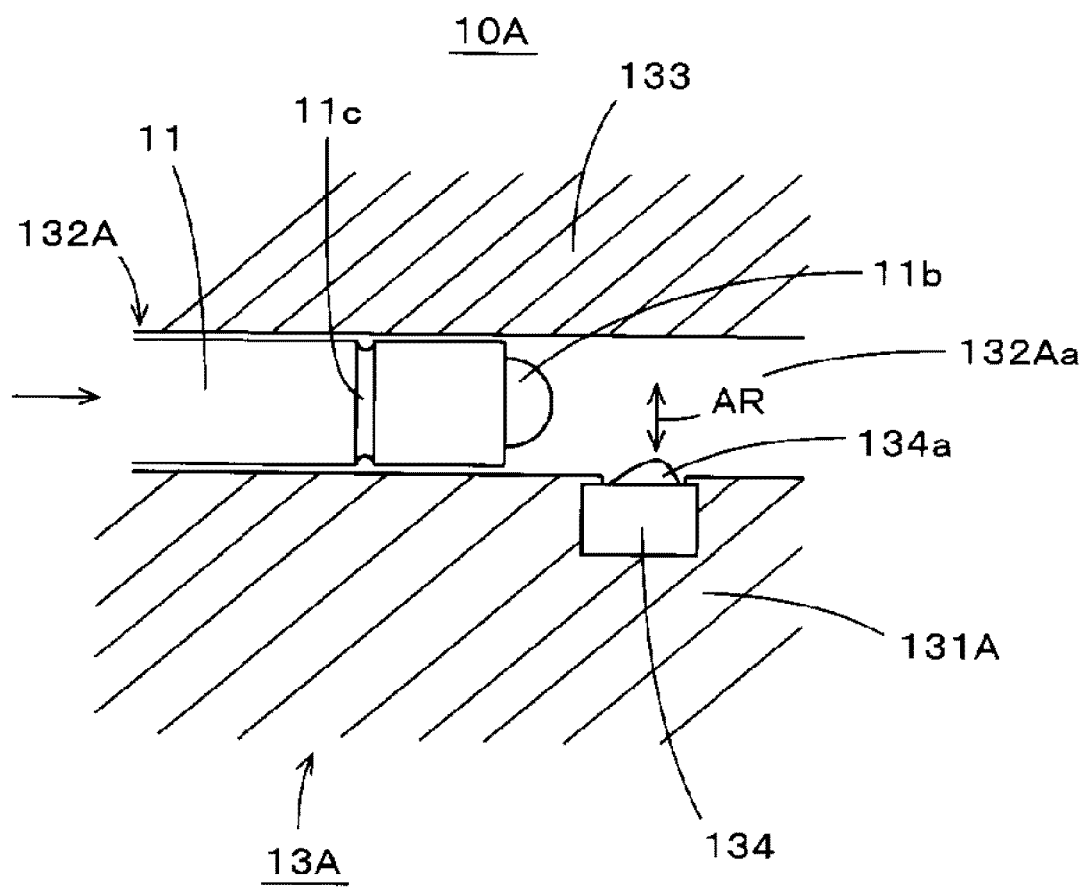
FIG. 9 is a diagram for explaining a configuration example of a three-dimensional position indicator according to a second embodiment of the disclosure.

FIG. 9 is a diagram for explaining a configuration example of part of the three-dimensional position indicator 10A of this second embodiment. FIG. 9 illustrates a sectional view of one part of the grip part 131, the electronic pen mounting part 132, and the tracker mounting part 133 of the holder 13A of the three-dimensional position indicator 10A of this second embodiment.

In this second embodiment, mounting detecting means that detects whether or not the electronic pen 11 is mounted is disposed in the holder 13A of the three-dimensional position indicator 10A. Moreover, mounting detection output of the electronic pen 11 in this mounting detecting means is notified to a spatial position detecting circuit 410A (see FIG. 10) of a spatial rendering information generating device 40A in this second embodiment together with light reception output of light receiving sensors and so forth through the tracker 12, in this example. The configuration may of course be made in such a manner that the mounting detection output of the electronic pen 11 from the mounting detecting means is notified to the spatial position detecting circuit 410A of the spatial rendering information generating device 40A not through the tracker 12 but independently.

In this example, as depicted in FIG. 9, a switch member 134 including a pressing element 134a capable of being elastically deformed in a direction of an arrow AR is used as the mounting detecting means. The switch member 134 is in a switch-off state, for example, in the state in which the pressing element 134a is not pressed and protrudes to the outside of a casing of the switch member 134. The switch member 134 is in a switch-on state in the state in which the pressing element 134a is pressed to be pushed into the casing of the switch member 134.

Therefore, when the electronic pen 11 is inserted into a tubular recessed hole part 132Aa of the electronic pen mounting part 132A as depicted in FIG. 9, the pressing element 134a of the switch member 134 is pressed down by the casing of this electronic pen 11 and the switch state of the switch member 134 changes (in this example, from switch-off to switch-on). Moreover, the switch state in the switch member 134 is supplied to the spatial position detecting circuit 410A of the spatial rendering information generating device 40A through the tracker 12, as the mounting detection output of the electronic pen 11.

Figure 10:
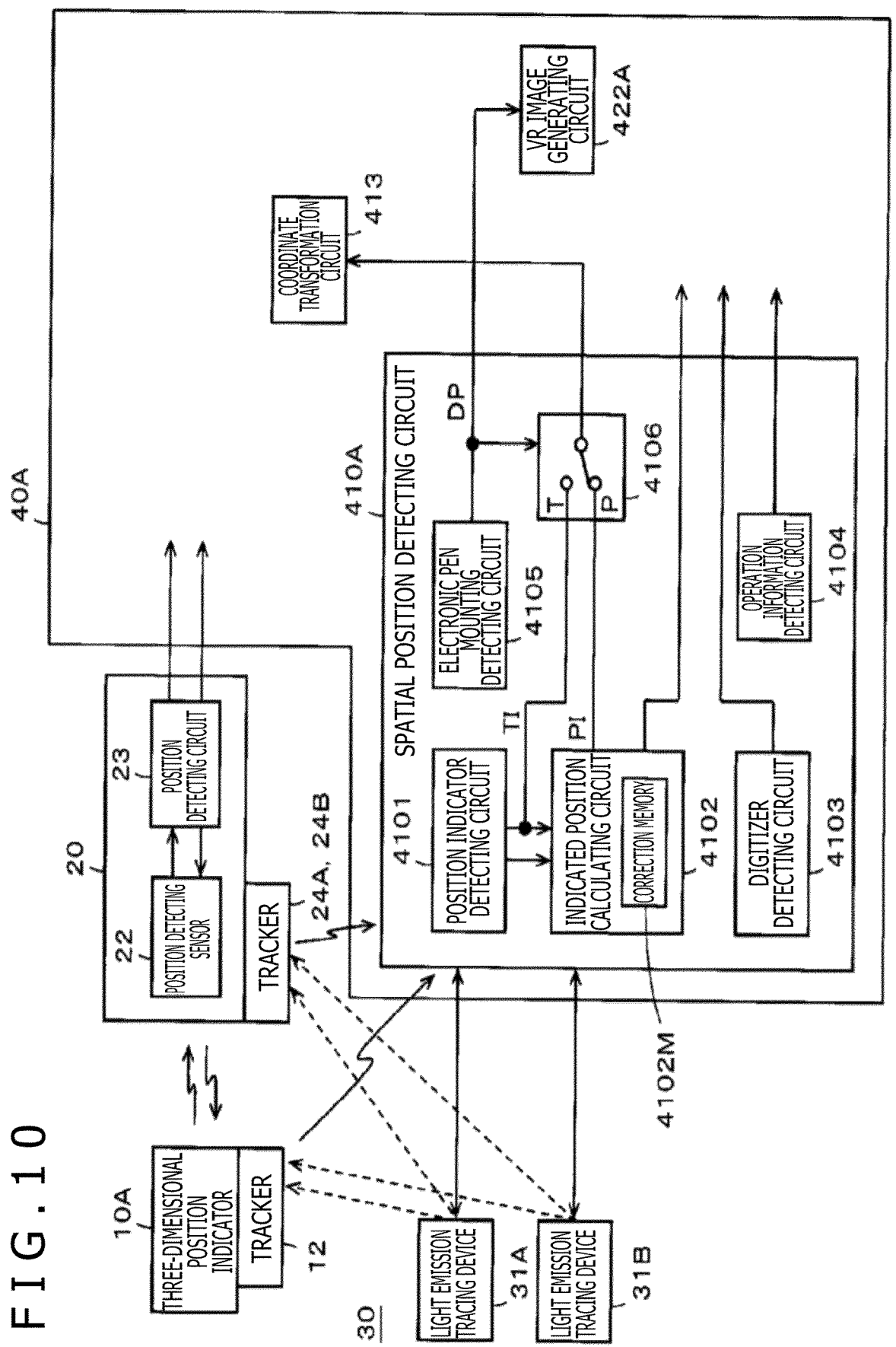
FIG. 10 is a block diagram for explaining a configuration example of the spatial position detection system according to the second embodiment of the disclosure.

In FIG. 10, a configuration example of particularly the spatial position detecting circuit 410A of the spatial rendering information generating device 40A in the case of this second embodiment is depicted. Also in the example of FIG. 10, the same part as the spatial rendering information generating device 40 and the spatial position detecting circuit 410 of the above-described first embodiment is given the same reference symbol, and detailed description thereof is omitted.

In the spatial position detecting circuit 410A of this second embodiment, an electronic pen mounting detecting circuit 4105 and a switch circuit 4106 are disposed in addition to the above-described position indicator detecting circuit 4101, indicated position calculating circuit 4102, digitizer detecting circuit 4103, and operation information detecting circuit 4104.

The electronic pen mounting detecting circuit 4105 receives and analyzes the mounting detection output of the electronic pen 11 from the three-dimensional position indicator 10A and detects whether or not the electronic pen 11 is mounted to the electronic pen mounting part 132 to output mounting detection output DP as the detection result thereof.

To one input terminal T of the switch circuit 4106, information TI on the position of the tracker 12 of the three-dimensional position indicator 10A detected by the position indicator detecting circuit 4101 is supplied. To the other input terminal P, information PI on the position of the pen tip 11a of the mounted electronic pen 11 calculated by the indicated position calculating circuit 4102 is supplied.

Further, the mounting detection output DP of the electronic pen mounting detecting circuit 4105 is supplied to the switch circuit 4106, as a switching control signal. Based on the mounting detection output DP, when the electronic pen 11 is not mounted in the three-dimensional position indicator 10A, the switch circuit 4106 is switched to the side of the one input terminal T and the information TI on the position of the tracker 12 is output as the output information. When the electronic pen 11 is mounted in the three-dimensional position indicator 10A, the switch circuit 4106 is switched to the side of the other input terminal P and the information PI on the position of the pen tip 11a of the electronic pen 11 is output as the output information. Then, the output information of the switch circuit 4106 is supplied to the coordinate transformation circuit 413.

Further, the mounting detection output DP of the electronic pen mounting detecting circuit 4105 is supplied to a VR image generating circuit 422A. When determining that the electronic pen 11 is mounted in the three-dimensional position indicator 10A based on the mounting detection output DP, the VR image generating circuit 422A generates a VR image of the electronic pen 11 similarly to the above-described first embodiment and displays the VR image on the HMD 50. Moreover, when determining that the electronic pen 11 is not mounted in the three-dimensional position indicator 10A based on the mounting detection output DP, in this second embodiment, the VR image generating circuit 422A does not generate a VR image of the electronic pen 11 but generates, for example, a VR image of the tracker 12 or a predetermined mark at the position of the detected tracker 12 and displays it on the HMD 50.

In the above-described manner, in the second embodiment, the same operation as in the first embodiment is carried out only when the electronic pen 11 is mounted in the three-dimensional position indicator 10A. Moreover, when the electronic pen 11 is not mounted in the three-dimensional position indicator 10A, it is possible to use the three-dimensional position indicator 10A as another use application using the tracker position.

In the above-described example, the switch member 134 is disposed as the mounting detecting means for automatically detecting mounting when the electronic pen 11 is mounted to the electronic pen mounting part 132A of the holder 13 of the three-dimensional position indicator 10A. However, the mounting detecting means is not limited to the switch member 134.

Moreover, although the mounting detecting means for automatically detecting mounting when the electronic pen 11 is mounted to the electronic pen mounting part 132A of the holder 13 of the three-dimensional position indicator 10A is disposed in the above-described second embodiment, the mounting of the electronic pen 11 may be notified to the spatial position detecting circuit 410A of the spatial rendering information generating device 40A not by the mounting detecting means but by operation by the user.

Furthermore, in the case of the example in which the user gives notification of the mounting of the electronic pen 11 in the three-dimensional position indicator by operating the operation part of the three-dimensional position indicator 10, even when the electronic pen 11 is not actually mounted, a VR image of the electronic pen 11 can be generated in the VR image generating circuit 422A and be displayed on the HMD 50, based on the assumption that the electronic pen 11 is virtually mounted in the three-dimensional position indicator 10.

MODIFICATION EXAMPLES OF ABOVE-DESCRIBED EMBODIMENTS

In the three-dimensional position indicator 10 of the above-described embodiment, the configuration in which the holder 13 includes the grip part 131 is employed. However, as depicted in FIGS. 11A, 11B, and 11C, a three-dimensional position indicator 10B including a holder 13B that does not include the grip part 131 but includes the electronic pen mounting part 132 and the tracker mounting part 133 may be configured. The three-dimensional position indicator 10B has the same configuration as the three-dimensional position indicator 10 described by using FIG. 5 and FIGS. 6A, 6B, and 6C except that the configuration of the holder is changed as depicted by being given the same reference symbols in FIGS. 11A, 11B, and 11C.

In the case of the three-dimensional position indicator 10B, the operation buttons 131a and 131b depicted in FIG. 5 and FIGS. 6A, 6B, and 6C may be disposed in the electronic pen mounting part 132. Moreover, also in the three-dimensional position indicator 10B, the electronic pen 11 may be fixed to the holder 13B. In addition, instead of using the electronic pen 11 as the bar-shaped part, the bar-shaped part may be configured integrally with the holder 13B by disposing the functional parts of the electronic pen 11 in the bar-shaped part. Furthermore, it goes without saying that the configuration of the three-dimensional position indicator 10B depicted in FIGS. 11A, 11B, and 11C can also be applied to the case of the second embodiment.

In the above-described embodiments, the unit 30 for spatial position detection is given the configuration including the light emission tracing devices that emit infrared laser light and the trackers. However, it goes without saying that the unit 30 for spatial position detection is not limited to this configuration. For example, a configuration using another invisible light sensor, a visible light beam sensor, or a combination of them may be employed.

In addition, a configuration in which a battery is disposed in an electronic pen, transmitting-receiving means of radio waves is disposed therein, and the spatial position of the electronic pen is detected by transmitting radio waves to the electronic pen from the outside and receiving radio waves from this electronic pen may be employed. Moreover, one that uses magnetic resonance or one that uses ultrasonic waves may be employed. Further, a configuration in which a target object (electronic pen or tablet) with respect to which the spatial position is detected is photographed by one or plural cameras and the spatial position of the target object is detected by using the photographed image thereof may be employed.

Further, in the above-described embodiments, the configuration is made in such a manner that a VR image of the digitizer 20 is generated and the operator recognizes the position of the digitizer 20 on the display screen of the HMD 50. However, a configuration may of course be made in such a manner that what is compatible with AR (Augmented Reality) is employed as the HMD and the digitizer 20 can be directly viewed.

Further, in the explanation of the above-described embodiments, gesture based on motion of the electronic pen is detected in the spatial region outside the position detection region DT of the digitizer. However, it is also possible to detect not motion of the electronic pen but the position indicated by the pen tip of the electronic pen and use the position for rendering in the outside spatial region as well.

Further, in the above-described embodiments, the separation distance of the position of the pen tip 11a of the electronic pen 11 from the input surface of the digitizer 20 is detected based on the reception level of a signal between the sensor 22 of the digitizer 20 and the electronic pen 11. However, the method for detecting the separation distance between the pen tip 11a of the electronic pen 11 and the input surface of the digitizer 20 is not limited thereto.

For example, in the unit 30 for spatial position detection, the position of the pen tip 11a of the electronic pen 10 and the position of the input surface 21S of the digitizer 20 can be detected. Therefore, the separation distance between the position of the pen tip 11a of the electronic pen 11 and the input surface 21S of the digitizer 20 may be detected from the detected position of the pen tip 11a of the electronic pen 11 and the detected position of the input surface 21S of the digitizer 20, and the selection control signal of the selection circuit 401 may be generated.

Further, means for displaying a three-dimensional image is not limited to the HMD, and a 3D display, an AI (Aerial Imaging) plate, and a hologram technique may be used. In addition, a display such as an LCD, for example, may be disposed for the digitizer 20, and 3D displaying may be carried out in the display. These kinds of display means may be used together with the HMD and be employed as one that is for allowing a person other than the person who wears the HMD to view a rendering image displayed on the HMD.

Further, in transformation of coordinates, coordinate values of the pen tip of the electronic pen detected by the unit 30 for spatial position detection are transformed to coordinate values of the coordinate system in the digitizer 20. However, conversely, coordinate values of the pen tip of the electronic pen detected by the digitizer 20 may be transformed to coordinate values of the coordinate system in the unit 30 for spatial position detection.

Further, in the above-described embodiments, as the electronic pen and the digitizer, ones of the electromagnetic induction system are used. However, they are not limited thereto and it is of course also possible to use electronic pens and digitizers of the capacitive system (including active capacitive coupling system and passive capacitive coupling system) or another system.

Furthermore, the digitizer of the above-described embodiments may be a portable mobile phone terminal referred to as what is generally called a smartphone or may be a personal computer with a digitizer.

In the above explanation, the case of carrying out 3D rendering by the spatial position indication system is described. However, the rendering image as the target of the disclosure may be a 2D rendering image or 2.5D rendering image.

DESCRIPTION OF REFERENCE SYMBOLS

10 Three-dimensional position indicator
11 Electronic pen
11a Pen tip of the electronic pen 11
12 Tracker
13 Holder
20 Digitizer
22 Position detecting sensor
23 Position detecting circuit
24A, 24B Tracker
30 Unit for spatial position detection
31A, 31B Light emission tracing device
40 Spatial rendering information generating device
41 Input information processing part
42 Display image generating part
50 HMD
131 Grip part
132 Electronic pen mounting part
133 Tracker mounting part
410 Spatial position detecting circuit
413 Coordinate transformation circuit
421 Rendering image generating circuit
422 VR image generating circuit

The invention claimed is:

1. A position indicator that indicates a position in a three-dimensional (3D) space, the position indicator comprising:
an elongated casing;
a position indicating part which is disposed at one end of the elongated casing and which, in operation, indicates the position;
a grip part that extends in a first direction intersecting a second direction in which an axis of the elongated casing extends and is configured to be gripped with a palm of a user in a state in which the elongated casing is gripped between fingers of the user; and
a tracker which, in operation, causes an external device to detect a tracker position of the tracker in the 3D space, wherein the tracker is disposed so as to be not covered by the user's hand when the user palm-grips the grip part;

wherein the tracker position of the tracker and a position of the position indicating part are in a specific positional relation.

2. The position indicator according to claim 1, wherein: the tracker includes a Light Emitting Diode.

3. The position indicator according to claim 1, wherein: the grip part includes an operation part operable by the user, and the position indicator further comprises a communication circuit which, in operation, communicates with the external device in response to operation of the operation part.

4. The position indicator according to claim 1, wherein: the elongated casing includes an operation part operable by the user.

5. The position indicator according to claim 1, wherein: the tracker is disposed so as to face the grip part across the axis of the elongated casing.

6. The position indicator according to claim 1, further comprising:
a holder to which the elongated casing is mounted so that the tracker position of the tracker and the position of the position indicating part are in the specific positional relation.

7. The position indicator according to claim 1, wherein:
the position indicating part, in operation, indicates the position on an input surface of a position detecting sensor, and
the position indicating part, in operation, couples to the position detecting sensor by an electromagnetic induction system.

8. The position indicator according to claim 1, wherein:
the position indicating part, in operation, indicates the position on an input surface of a position detecting sensor, and
the position indicating part, in operation, couples to the position detecting sensor by a capacitive coupling system.

9. The position indicator according to claim 1, wherein:
the position indicating part, in operation, indicates the position in a VR (Virtual Reality) space.

10. A position detection system comprising:
a position indicator that indicates a position in a three-dimensional (3D) space;
a spatial position detecting circuit; and
a computer;
wherein the position indicator includes:
an elongated casing;
a position indicating part which is disposed at one end of the elongated casing and which, in operation, indicates the position;
a grip part that extends in a first direction intersecting a second direction in which an axis of the elongated casing extends and is configured to be gripped with a palm of a user in a state in which the elongated casing is gripped between fingers of the user; and
a tracker which, in operation, causes the spatial position detecting circuit to detect a tracker position of the tracker in the 3D space, wherein the tracker position of the tracker and a position of the position indicating part are in a specific positional relation, and the tracker is disposed so as to be not covered by the user's hand when the user palm-grips the grip part;
wherein the spatial position detecting circuit includes:
a position detecting part which, in operation, detects the tracker position of the tracker; and
wherein the computer includes:
circuitry which, in operation, computes, based on the tracker position of the tracker detected by the spatial position detecting circuit and the specific positional relation, the position in the 3D space indicated by the position indicator.

11. The position detection system according to claim 10, wherein:
the computer further includes a memory which, in operation, stores correction values which are generated based on the specific position relation and used to compute the position in the 3D space indicated by the position indicator.

12. The position detection system according to claim 10, further comprising:
a position detecting sensor;
wherein the circuitry of the computer, in operation, selects either one of the position indicated by the position indicator as detected by the position detecting sensor or the position indicated by the position indicator as computed by the computer.

13. The position detection system according to claim 10, further comprising:
a position detecting sensor;
wherein the circuitry of the computer, in operation, performs coordinate transformation that causes a first one of a coordinate system of the 3D space and a coordinate system of a input surface of the position detecting sensor to correspond with a second one of the coordinate system of the 3D space and the coordinate system of the input surface of the position detecting sensor.

14. The position detection system according to claim 10, further comprising:
a display which, in operation, displays a locus of the position indicated by the position indicator;
wherein an image including the locus displayed on the display is a VR (Virtual Reality) image.

* * * * *